United States Patent
Lee

(10) Patent No.: US 11,836,274 B2
(45) Date of Patent: Dec. 5, 2023

(54) SYSTEM FOR EMBEDDING DIGITAL VERIFICATION FINGERPRINT AND METHOD THEREOF

(71) Applicant: Humanscape Inc., Seoul (KR)

(72) Inventor: TaeWoo Lee, Seoul (KR)

(73) Assignee: Humanscape Inc., Seoul (KR)

( * ) Notice: Subject to any disclaimer, the term of this patent is extended or adjusted under 35 U.S.C. 154(b) by 90 days.

(21) Appl. No.: 17/068,565

(22) Filed: Oct. 12, 2020

(65) Prior Publication Data
US 2022/0019697 A1   Jan. 20, 2022

(30) Foreign Application Priority Data
Jul. 16, 2020  (KR) .................... 10-2020-0087955

(51) Int. Cl.
*G06F 21/64*  (2013.01)
*G06F 16/27*  (2019.01)
(Continued)

(52) U.S. Cl.
CPC .......... *G06F 21/64* (2013.01); *G06F 16/2365* (2019.01); *G06F 16/24* (2019.01); *G06F 16/27* (2019.01); *G06F 21/62* (2013.01)

(58) Field of Classification Search
CPC .......... G06F 21/64; G06F 21/16; G06F 21/10; G06F 21/32; G06F 21/62; G06F 16/24;
(Continued)

(56) References Cited

U.S. PATENT DOCUMENTS

| | | | |
|---|---|---|---|
| 6,373,960 B1 * | 4/2002 | Conover | G06T 1/0035 348/412.1 |
| 8,538,069 B2 * | 9/2013 | Anderson | G06K 9/46 382/100 |

(Continued)

FOREIGN PATENT DOCUMENTS

| | | | | |
|---|---|---|---|---|
| CN | 1177776 A | * | 4/1998 | ....... G06F 17/30949 |
| CN | 1366669 A | * | 8/2002 | ........... G06T 1/0071 |

(Continued)

OTHER PUBLICATIONS

Watermarking based image authentication and tamper detection algorithm using vector quantization approach by Archana Tiwari, Manisha Sharma, Raunak Kumar Tamrakar pp. 10; Dated: May 17, 2017.*

(Continued)

*Primary Examiner* — Shahriar Zarrineh
*Assistant Examiner* — Ali H. Cheema
(74) *Attorney, Agent, or Firm* — Knobbe, Martens, Olson & Bear, LLP

(57) ABSTRACT

A system includes a data module for receiving an original data and a verification fingerprint, and generating a verification data by inserting the verification fingerprint into an embeddable location of the original data. The system also includes an interpretation module for generating data type information of the original data, and deriving an input-enabled location from an embedding location preset list of the original data, wherein the input-enabled location is included in an inactive area of the original data. The system further includes a preset database for storing the embedding location preset list according to the data type information.

18 Claims, 15 Drawing Sheets

(51) Int. Cl.
  *G06F 21/62* (2013.01)
  *G06F 16/24* (2019.01)
  *G06F 16/23* (2019.01)

(58) Field of Classification Search
  CPC .... G06F 16/27; G06F 16/236; G06F 16/2365; G06K 9/00; G06K 9/36
  USPC .......................................................... 726/30
  See application file for complete search history.

(56) References Cited

U.S. PATENT DOCUMENTS

| | | | |
|---|---|---|---|
| 8,671,030 B1 | 3/2014 | Sethi | |
| 10,452,964 B1 | 10/2019 | Chapman et al. | |
| 2001/0040977 A1 | 11/2001 | Nakano | |
| 2002/0006212 A1 | 1/2002 | Rhoads et al. | |
| 2002/0090107 A1* | 7/2002 | Acharya | H04N 1/32149 382/100 |
| 2005/0175224 A1* | 8/2005 | Venkatesan | G06F 21/10 380/201 |
| 2005/0190948 A1* | 9/2005 | Isogai | H04N 1/32304 382/100 |
| 2007/0130188 A1* | 6/2007 | Moon | G06F 21/64 |
| 2009/0067671 A1 | 3/2009 | Alattar | |
| 2010/0067807 A1 | 3/2010 | Kim et al. | |
| 2010/0303282 A1* | 12/2010 | Boyd | H04N 1/32304 382/100 |
| 2010/0310118 A1 | 12/2010 | Rhoads et al. | |
| 2011/0058707 A1 | 3/2011 | Rhoads et al. | |
| 2011/0133887 A1 | 6/2011 | Tian et al. | |
| 2012/0179951 A1 | 7/2012 | Brundage et al. | |
| 2012/0204034 A1 | 8/2012 | Martinez et al. | |
| 2012/0215811 A1 | 8/2012 | Tipper et al. | |
| 2013/0015236 A1 | 1/2013 | Porter et al. | |
| 2013/0097380 A1* | 4/2013 | Colgrove | G06F 16/1752 711/E12.017 |
| 2013/0290465 A1* | 10/2013 | Harrison | H04L 67/02 709/213 |
| 2015/0067882 A1 | 3/2015 | Serret-Avila et al. | |
| 2015/0365426 A1* | 12/2015 | Henocque | H04L 9/3236 713/176 |
| 2016/0026626 A1 | 1/2016 | Beadles | |
| 2016/0049153 A1* | 2/2016 | Kakkirala | G10L 19/018 700/94 |
| 2017/0270320 A1 | 9/2017 | Petrogiannis et al. | |
| 2017/0300905 A1 | 10/2017 | Withrow et al. | |
| 2018/0181765 A1 | 6/2018 | Rietsch | |
| 2018/0234397 A1 | 8/2018 | Dube et al. | |
| 2018/0268169 A1 | 9/2018 | Sprague et al. | |
| 2019/0318067 A1 | 10/2019 | Chappelier et al. | |
| 2020/0210555 A1* | 7/2020 | Liu | G06F 21/602 |

FOREIGN PATENT DOCUMENTS

| | | | | | |
|---|---|---|---|---|---|
| CN | 1577394 | A | * | 2/2005 | ............ G06F 21/10 |
| CN | 102298765 | A | * | 12/2011 | |
| CN | 103414960 | A | * | 11/2013 | |
| CN | 104134023 | A | * | 11/2014 | ............ G06F 21/16 |
| CN | 105205355 | A | * | 12/2015 | |
| CN | 107423588 | A | * | 12/2017 | ............ G06F 21/16 |
| CN | 109600620 | A | * | 4/2019 | ........... H04N 19/467 |
| CN | 111028850 | A | * | 4/2020 | |
| CN | 111309262 | A | * | 6/2020 | |
| JP | H11196254 | A | * | 7/1999 | |
| JP | 2001211311 | A | * | 8/2001 | |
| KR | 2002-0093680 | A | | 12/2002 | |
| KR | 2003-0074568 | A | | 9/2003 | |
| KR | 2007-0061605 | A | | 6/2007 | |
| KR | 20080029867 | A | * | 4/2008 | |
| KR | 2009-0075643 | A | | 7/2009 | |
| KR | 2012-0005392 | A | | 1/2012 | |
| KR | 10-1145110 | B1 | | 5/2012 | |
| KR | 101450335 | B1 | * | 12/2014 | |
| KR | 2016-0086680 | A | | 7/2016 | |
| KR | 10-1664228 | B1 | | 10/2016 | |
| KR | 2017-0044501 | A | | 4/2017 | |
| KR | 10-1746167 | B1 | | 6/2017 | |
| KR | 10-1880175 | B1 | | 7/2018 | |
| KR | 10-1893729 | B1 | | 10/2018 | |
| KR | 2019-0005346 | A | | 1/2019 | |
| KR | 10-1976098 | B1 | | 5/2019 | |
| KR | 10-1979115 | B1 | | 5/2019 | |
| KR | 2019-0120498 | A | | 10/2019 | |
| TW | 201308114 | A | * | 2/2013 | |
| WO | WO-2007035062 | A1 | * | 3/2007 | ......... G06F 21/6209 |
| WO | WO-2008124528 | A2 | * | 10/2008 | ........... G06T 1/0028 |
| WO | WO-2008127052 | A1 | * | 10/2008 | ....... G06F 17/30743 |
| WO | WO-2010151444 | A1 | * | 12/2010 | ............ G06F 21/10 |
| WO | WO-2013139398 | A1 | * | 9/2013 | ............ G06F 21/10 |

OTHER PUBLICATIONS

Region-Based Image Watermarking by Athanasios Nikolaidis and Ioannis Pitas, Senior Member, IEEE pp. 15; Dated: Nov. 11, 2001.*
A High-Capacity Data Hiding Algorithm Based on Switching and Matrix Encoding Techniques by Sunita Waykole, Deepa Indrawal and Dr. Archana Sharma pp. 8; Dated: Aug. 9, 2019.*

* cited by examiner

| Data eigenvalue | Verification fingerprint | Inquirer information | Request time | Integrity value | Remarks |
|---|---|---|---|---|---|
| I2 | 1234 5678 | User1 | 2020-03-24 15:50:28 | H1 | ...... |
| I2' | 2343 3231 | User2 | 2020-05-01 17:32:11 | H1' | ...... |
| I2" | 0F24 654C | User3 | 2020-07-10 05:34:06 | H1" | ...... |
| ...... | ...... | ...... | ...... | ...... | ...... |

FIG. 8

```
                                                       Li    Do
0000000 0000 0001 0001 1010 0010 0001 0004 0128
0000010 0000 0016 0000 0028 0000 0010 0000 0020
0000020 0000 0001 0004 0000 0000 0000 0000 0000
0000030 0000 0000 0000 0010 0000 0000 0000 0204
0000040 0004 8384 0084 c7c8 00c8 4748 0048 e8e9
0000050 00e9 6a69 0069 a8a9 00a9 2828 0028 fdfc
0000060 00fc 1819 0019 9898 0098 d9d8 00d8 5857
0000070 0057 7b7a 007a bab9 00b9 3a3c 003c 8888
0000080 8888 8888 8888 8888 288e be88 8888 8888
0000090 3b83 5788 8888 8888 7667 778e 8828 8888
00000a0 d61f 7abd 8818 8888 467c 585f 8814 8188
00000b0 8b06 e8f7 88aa 8388 8b3b 88f3 88bd e988
00000c0 8a18 880c e841 c988 b328 6871 688e 958b
00000d0 a948 5862 5884 7e81 3788 1ab4 5a84 3eec
00000e0 3d86 dcb8 5cbb 8888 8888 8888 8888 8888
00000f0 8888 8888 8888 8888 8888 8888 8888 0000
0000100 0000 0000 0000 0000 0000 0000 0000 0000
*
0000130 0000 0000 0000 0000 0000 0000 0000
000013e
         Li
```

↓ Conversion

```
                                                    Fp1(Li)  Dv
0000000 0000 0001 0001 1010 0010 0001 0004 0128
0000010 0000 0016 0000 0028 0000 0010 0000 0020
0000020 0000 0001 0004 0000 0000 1234 5678 0000
0000030 0000 0000 0000 0010 0000 0000 0000 0204
0000040 0004 8384 0084 c7c8 00c8 4748 0048 e8e9
0000050 00e9 6a69 0069 a8a9 00a9 2828 0028 fdfc
0000060 00fc 1819 0019 9898 0098 d9d8 00d8 5857
0000070 0057 7b7a 007a bab9 00b9 3a3c 003c 8888
0000080 8888 8888 8888 8888 288e be88 8888 8888
0000090 3b83 5788 8888 8888 7667 778e 8828 8888
00000a0 d61f 7abd 8818 8888 467c 585f 8814 8188
00000b0 8b06 e8f7 88aa 8388 8b3b 88f3 88bd e988
00000c0 8a18 880c e841 c988 b328 6871 688e 958b
00000d0 a948 5862 5884 7e81 3788 1ab4 5a84 3eec
00000e0 3d86 dcb8 5cbb 8888 8888 8888 8888 8888
00000f0 8888 8888 8888 8888 8888 8888 8888 0000
0000100 1234 5678 0000 0000 0000 0000 0000 0000
*
0000130 0000 0000 0000 0000 0000 0000 0000
000013e
         Fp1(Li)
```

SYSTEM FOR EMBEDDING DIGITAL VERIFICATION FINGERPRINT AND METHOD THEREOF

CROSS-REFERENCE TO RELATED APPLICATION

This application claims priority from Korean Patent Application No. 10-2020-0087955 filed on Jul. 16, 2020 in the Korean Intellectual Property Office, and all the benefits accruing therefrom under 35 U.S.C. 119, the contents of which in its entirety are herein incorporated by reference. This application relates to U.S. application Ser. No. 17/068,499 filed on Oct. 12, 2020, now U.S. Pat. No. 11,645,406 issued May 9, 2023, entitled "SYSTEM FOR VERIFYING DATA ACCESS AND METHOD THEREOF" which is concurrently filed with this application and incorporated herein by reference in its entirety.

BACKGROUND

1. Field

The present inventive concept relates to a system for embedding a digital verification fingerprint and a method thereof. Specifically, the described technology relates to a system and a method for inserting a digital verification fingerprint for minimizing an effect on an original data.

2. Description of the Related Technology

Due to the effects of the recent rapid development of technology, it has become easy to access data online from anywhere in the world. Instead, restricting and managing access to data that require security is emerging as an important issue. Particularly for information that require limited access, such as personal information of a specific individual, or the medical information of a patient, verification of data after access may be necessary.

To achieve this, a watermarking technology has been proposed in which a watermark, which is a type of digital signature, is inserted into the original data. Digital watermarking is a type of copyright protection technology that solves copyright issues by inserting specific data called a watermark into digital data and re-extracting the data content.

Such watermarking must be performed within a scope that does not modify the original data. Therefore, there is a need to discuss the technology of inserting a digital verification fingerprint into the original data.

SUMMARY

An object of the described technology is to provide a system for embedding a digital verification fingerprint that verifies data using an independent verification fingerprint for data access.

Another object of the described technology is to provide a method for inserting a digital verification fingerprint for verifying data using an independent verification fingerprint for data access.

The objects of the described technology are not limited to the above, and other objects and advantages not mentioned can be understood from the following description, and more clearly understood from the embodiments of the described technology. In addition, it will be apparent that the objects and advantages of the described technology can be carried out by the means in the scope of the claims and a combination thereof.

According to an aspect of the present inventive concept, there is provided a system for embedding a digital verification fingerprint, comprising a data module for receiving an original data and a verification fingerprint, and generating a verification data by inserting the verification fingerprint into an embeddable location of the original data, an interpretation module for generating data type information of the original data, and deriving an input-enabled location from an embedding location preset list of the original data, wherein the input-enabled location is included in an inactive area of the original data and a preset database for storing the embedding location preset list according to the data type information.

In some embodiments of the present inventive concept, the system may further comprise a preset module for receiving the data type information to deliver it to the preset database, and receiving the embedding location preset list from the preset database to deliver it to the data module.

In some embodiments of the present inventive concept, wherein the original data and the verification fingerprint are indicated as hex codes.

In some embodiments of the present inventive concept, wherein the embedding location preset list comprises a plurality of areas, wherein the plurality of areas comprises one or more of a substitutable area and an insertable area, wherein the substitutable area is not used when filled with insignificant values, so that the verification fingerprint is inserted in a substitution method, and wherein the insertable area has no recorded values, so that the verification fingerprint is directly inserted.

In some embodiments of the present inventive concept, wherein the interpretation module appoints a review area from the plurality of areas, and determines whether the review area has been used to select it as the input-enabled location.

In some embodiments of the present inventive concept, wherein the interpretation module determines a length of the review area to select it as the input-enabled location.

According to another aspect of the present inventive concept, there is provided a method for inserting a digital verification fingerprint, comprising receiving an original data and a first verification fingerprint, checking a data type of the original data, receiving an embedding location preset list according to the data type, extracting an input-enabled location from the embedding location preset list, and inserting the first verification fingerprint into the input-enabled location to generate a first verification data.

In some embodiments of the present inventive concept, wherein the step of extracting the input-enabled location comprises appointing a review area from the embedding location preset list, determining whether the review area has been used, and if the review area has not been used, adding the review area to a reserve usable area list when a length of the review area is smaller than a length of the verification fingerprint, and adding the review area to a usable area list when a length of the review area is greater or equal to a length of the verification fingerprint, and extracting at least a portion of the usable area list as the input-enabled location.

In some embodiments of the present inventive concept, the method may further comprises, before extracting at least a portion of the usable area list as the input-enabled location, determining whether all areas of the embedding location list have been checked, and if all areas have been checked, determining whether two or more review areas have been added to the reserve usable area list, and if two or more review areas have been added to the reserve usable area list, generating a merged area merging the review areas added to the reserve usable area list, and if a length of the merged area is greater than or equal to a length of the verification fingerprint, adding the merged area to the usable area list.

In some embodiments of the present inventive concept, wherein the embedding location preset list comprises a substitutable area, an insertable area and an input-unenabled area, and wherein the merged area comprises the substitutable area, the insertable area and a combined area combining the substitutable area and the insertable area.

In some embodiments of the present inventive concept, wherein the step of extracting at least a portion of the usable area list as the input-enabled location, comprises randomly extracting one or more areas of the usable area list as the input-enabled location.

In some embodiments of the present inventive concept, wherein the step of extracting at least a portion of the usable area list as the input-enabled location, comprises extracting all areas included in the usable area list as the input-enabled location.

In some embodiments of the present inventive concept, wherein the step of extracting at least a portion of the usable area list as to the input-enabled location, comprises first extracting a substitutable area from an area included in the usable area list, determining whether further extraction of the input-enabled location is needed, and if further extraction of the input-enabled location is needed, further extracting an insertable area from an area included in the usable area list, and determining whether further extraction of the input-enabled location is needed, and if further extraction of the input-enabled location is needed, extracting a combined area from an area included in the usable area list.

In some embodiments of the present inventive concept, comprising storing a data eigenvalue and a first verification fingerprint corresponding to the original data in a first record, generating a first integrity value that has hashed the first verification data, and additionally storing the first integrity value in the first record to renew the first record.

In some embodiments of the present inventive concept, comprising receiving a second verification data, generating a second integrity value by hashing the second verification data, checking a corresponding original data through the second integrity value, contrasting the original data and the second verification data to extract a second verification fingerprint, and verifying the second verification data using the second integrity value and the second verification fingerprint.

In some embodiments of the present inventive concept, wherein an appearance of the first verification data is completely identical to an appearance of the original data.

In some embodiments of the present inventive concept, wherein an appearance of the first verification data is different from an appearance of the original data.

The system for embedding a digital verification fingerprint and a method for the same of the described technology allows independent verification of each data access, thereby allowing detailed tracking of the state of data.

In addition, modifications of the original data can be minimized to secure maximum rights of access of the requester, and simultaneously, the function of verifying access can be performed without any issues.

In addition to the above-described information, the specific effects of the described technology are disclosed along with the following description of the specific details for carrying out the described technology.

BRIEF DESCRIPTION OF THE DRAWINGS

The above and other features and advantages of the present inventive concept will become more apparent by describing in detail embodiments thereof with reference to the attached drawings.

FIG. 8 is an exemplary view illustrating the system for embedding a digital verification fingerprint according to some embodiments of the described technology converting original data into verification data.

DETAILED DESCRIPTION

Figure 1:
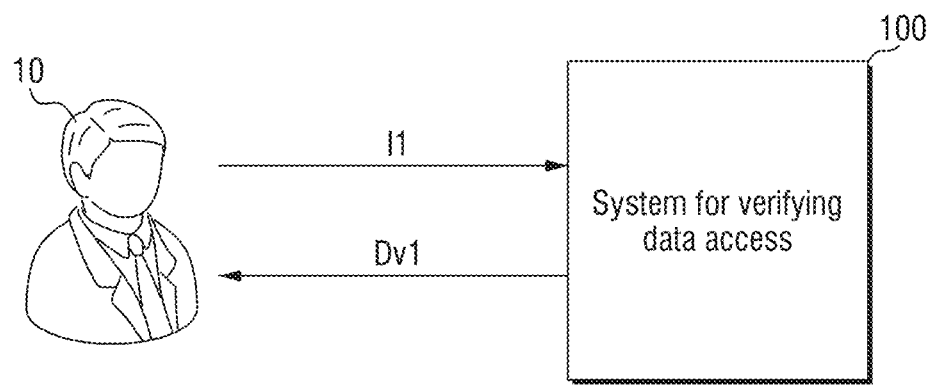
FIG. 1 is a conceptual diagram illustrating a system for embedding a digital verification fingerprint according to some embodiments.

The present inventive concept will now be described more fully hereinafter with reference to the accompanying drawings, in which embodiments of the described technology are shown. This described technology may, however, be embodied in different forms and should not be construed as limited to the embodiments set forth herein. Rather, these embodiments are provided so that this disclosure will be thorough and complete, and will fully convey the scope of the described technology to those skilled in the art. The same reference numbers indicate the same components throughout the specification. In the attached figures, the thickness of layers and regions is exaggerated for clarity.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

The use of the terms "a" and "an" and "the" and similar referents in the context of describing the described technology (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this described technology belongs. It is noted that the use of any and all examples, or exemplary terms provided herein is intended merely to better illuminate the described technology and is not a limitation on the scope of the described technology unless otherwise specified. Further, unless defined otherwise, all terms defined in generally used dictionaries may not be overly interpreted.

Below is a description of the system for verifying data access according to some embodiments of the present inventive concept with reference to FIG. 1 to FIG. 11.

FIG. 1 is a conceptual diagram illustrating the system for verifying data access according to some embodiments of the present inventive concept.

With reference to FIG. 1, the system for verifying data access 100 according to some embodiments of the present inventive concept can receive a data access request from a client 10. The client 10 can transmit a first data eigenvalue I1, while transmitting the data access request. The system for verifying data access 100 can provide the client 10 with a first verification data Dv1.

Specifically, the client 10 can be an inquirer requesting a browse and inquiry of data from the system for verifying data access 100. The client 10 can be someone with a legitimate title to browse the original data of the system for verifying data access 100.

The client 10 can transmit data to the system for verifying data access 100 via a network. The network can include a network by a wired internet technology, a wireless internet technology and a local area communication technology. Wired internet technologies can include one or more from a group consisting of, for example, LAN (local area network) and WAN (wide area network).

Wireless internet technologies can include one or more from a group consisting of, for example, WLAN (Wireless LAN), DLNA (Digital Living Network Alliance), Wibro (Wireless Broadband), Wimax (World Interoperability for Microwave Access). HSDPA (High Speed Downlink Packet Access), HSUPA (High Speed Uplink Packet Access). IEEE 802.16, LTE (Long Term Evolution), LTE-A (Long Term Evolution-Advanced), WMBS (Wireless Mobile Broadband Service) and 5G NR (New Radio). However, this embodiment is not limited to the above.

Local area communication technologies can include one or more from a group consisting of, for example, Bluetooth, RFID (Radio Frequency Identification), IrDA (Infrared Data Association), UWB (Ultra-Wideband), ZigBee, NFC (Near Field Communication), USC (Ultra Sound Communication), VLC (Visible Light Communication), Wi-Fi, Wi-Fi Direct and 5G NR (New Radio). However, this embodiment is not limited to the above.

The client 10 and the system for verifying data access 100 communicating through a network can adhere to technical standards and standard communication methods for mobile communication. For example, standard communication methods can include one or more from the group consisting of; GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTEA (Long Term Evolution-Advanced) and 5G NR (New Radio). However, this embodiment is not limited to the above.

The client 10 can communicate with the system for verifying data access 100 via a user terminal. A user terminal can refer to a data processing terminal owned by the client 10. The user terminal can be implemented as, for example, a PC (personal computer), a workstation, a data center, an internet data center (IDC), a DAS (direct attached storage) system, a SAN (storage area network) system, a NAS (network attached storage) system, a RAID (redundant array of inexpensive disks, or redundant array of independent disks) system, or a mobile device, however, is not limited to the above.

In addition, the mobile device can be implemented as a laptop computer, a portable phone, a smart phone, a tablet PC, a PDA (personal digital assistant), an EDA (enterprise digital assistant), a digital still camera, a digital video camera, a PMP (portable multimedia player), a PND (personal navigation device or a portable navigation device), a handheld game console, a mobile internet device (MID), a wearable computer, an internet of things (IoT) device, an internet of everything (IoE) device, a drone, or an e-book, however, is not limited to the above.

The first data eigenvalue I1 can be a value, which enables the client 10 to identify the original data making a browse requesting. For example, the first data eigenvalue I1 can be a key value of the original data. However, this embodiment is not limited to the above.

The system for verifying data access 100 can receive a first data eigenvalue I1 and a data access request from the client 10, and transmit a first verification data Dv1 to the client 10 in response.

In this regard, the transmission of the first verification data Dv1 by the system for verifying data access 100 to the client 10 can go through the network. However, this embodiment is not limited to the above.

The first verification data Dv1 is a data requested by the client 10, which can be a data that includes a verification fingerprint for verification in the original data. The first verification data Dv1 can be an identical data to the original data Do, with the exception of the verification fingerprint.

Figure 2:
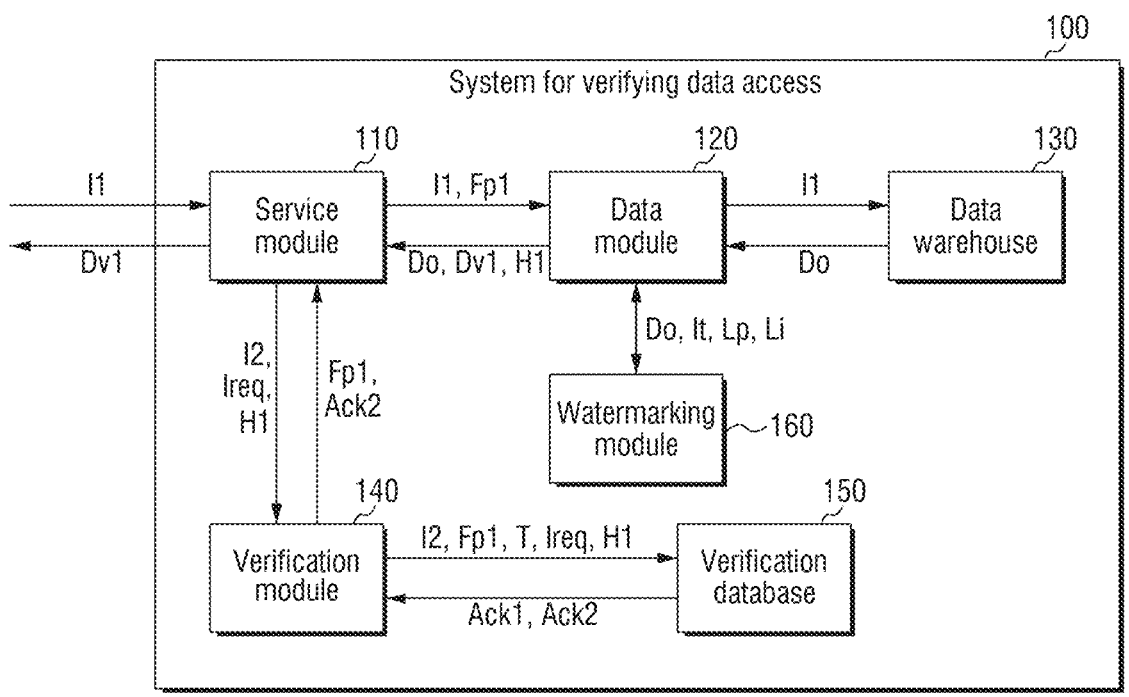
FIG. 2 is a block diagram illustrating in detail, the system for embedding a digital verification fingerprint of FIG. 1 inserting a verification fingerprint into an original data.

FIG. 2 is a block diagram illustrating in detail, the system for verifying data access of FIG. 1 inserting a verification fingerprint into the original data.

With reference to FIG. 1 and FIG. 2, the system for verifying data access 100 can include a service module 110, a data module 120, a data warehouse 130, a verification module 140, a verification database 150 and a watermarking module 160. One or more of the modules 110, 120, 140 and 160 can be implemented with one or more processors.

The service module 110 can be a module in direct communication with the client 10. The service module 110 can receive a first data eigenvalue I1 from the client 10. The service module 110 can receive a data access request along with the first data eigenvalue I1. The service module 110 can transmit a first verification data Dv1 to the client 10 in response to the data access request.

The data module 120 can derive an input-enabled location Li from the original data Do together with the watermarking module 160, and generate a first verification data Dv1 by inserting a first verification fingerprint Fp1 into the original data Do. In addition, the data module 120 can generate a first integrity value H1 of the first verification data Dv1. In addition, the data module 120 can be a module in direct communication with the data warehouse 130.

Specifically, the data module 120 can receive a first data eigenvalue I1 and a first verification fingerprint Fp1 from the service module 110. The data module can transmit the original data Do, the first verification data Dv1 and the first integrity value H1 to the service module 110.

In this regard, the original data Do can be a data responding to the data access request of the client 10 or a data identified by the first data eigenvalue I1. The original data Do can be one or more from a group of data in various forms, for example, an image, a video or a document. However, this embodiment is not limited to the above.

A first verification fingerprint Fp1 can be generated by the verification module 140. The first verification fingerprint Fp1 can generate a first verification data Dv1 by being inserted into the original data Do by the data module 120. The first verification fingerprint Fp1 can generate a first verification data Dv1 without damaging the content of the original data Do by being inserted into an unused area of the original data Do.

In this regard, the first verification data Dv1 may change a portion of the appearance of the original data Do, or may not. In other words, depending on the data type of the original data Do, there may or may not be a portion that does not change the appearance of the original data Do at all. Therefore, the first verification data Dv1 can be completely identical to the original data Do in appearance. Or the first verification data Dv1 may be different from the original data Do in appearance.

However, in either of the cases, the first verification data Dv1 can possibly not damage the content of the original data Do. In other words, a significant portion of the original data Do may be preserved completely in the first verification data Dv1, and an insignificant portion may be changed.

A first integrity value H1 can be a value generated by hashing a first verification data Dv1 by the data module 120. The first integrity value H1 can be generated using a unidirectional hash function. For example, the first integrity value H1 can be generated using one or more of MD5, SHA-1 and SHA-2 (i.e., SHA-224, SHA-256, SHA-384 and SHA-512). However, this embodiment is not limited to the above.

The data module 120 can transmit a first data eigenvalue I1 to the data warehouse 130. The data module 120 can receive the original data Do from the data warehouse 130. The data module 120 can transmit the original data Do to the watermarking module 160. The data module 120 can receive data type information It, an embedding location preset list Lp and an input-enabled location Li from the watermarking module 160.

In this regard, a data type can refer to the type of file of the original data Do. For example, a data type can refer to a type of file, such as PDF or JPG. However, this embodiment is not limited to the above.

The embedding location preset list Lp can refer to a list of locations to insert a predetermined first verification fingerprint Fp1 for each data type. In other words, the embedding location preset list Lp may be different for each data type. The embedding location preset list Lp can be located in an unused area of the original data Do for each data type. In this regard, an unused area can refer to an area in which the content of the original data Do does not change due to the insertion of a first verification fingerprint Fp1, or at least is difficult for the client 10 to verify such change.

The embedding location preset list Lp can display a plurality of areas using an offset and regular expression in the original data Do. In this regard, "offset" can refer to a method of expressing a location in a data, such as "n bytes from the front" or "n bytes from the back."

In addition, "regular expression" includes all methods of expressing a location and an area in a data in a hex code, such as "front of a specific expression or a character string" or "back of a specific expression or a character string" in the original data Do.

The input-enabled location Li can refer to an area in which a final input of the first verification fingerprint Fp1 from the embedding location preset list Lp is made. In other words, it can refer to an unused area in which the first verification fingerprint Fp1 is input after being finally filtered from the embedding location preset list Lp.

The data warehouse 130 can store original data Do within it. The data warehouse 130 can receive a first data eigenvalue I1 from the data module 120. The data warehouse 130 can send the original data Do corresponding to the first data eigenvalue I1 to the data module 120.

The verification module 140 can be a module generating a first verification fingerprint Fp1, and in direct communication with the verification database 150. However, this embodiment is not limited to the above.

Specifically, the verification module 140 can receive a second data eigenvalue I2, an inquirer information Ireq and a first integrity value H1. The verification module 140 can transmit a first verification fingerprint Fp1 and a second acknowledgement Ack2 to the service module 110.

The service module 110 can generate a second data eigenvalue I2 in response to the first data eigenvalue I1. In this regard, the second data eigenvalue I2 can be a distinct value that can specify or identify the original data Do. For example, the second data eigenvalue I2 can be a key value that can identify, the original data Do. In this regard, the second data eigenvalue I2 can be an identical value as the first data eigenvalue I1. However, this embodiment is not limited to the above.

Or the second data eigenvalue I2 can be a value of hashing the original data Do. In this regard, the second data eigenvalue I2 can be generated using a unidirectional hash function.

For example, the second data eigenvalue I2 can be generated using one or more of MD5, SHA-1 and SHA-2 (i.e., SHA-224, SHA-256, SHA-384 and SHA-512). However, this embodiment is not limited to the above.

The second data eigenvalue I2 can be a value of a different form that can identify the original data Do in addition to the above-described values.

An inquirer information Ireq can refer to the information of identity of the client 10. The inquirer information can include one or more from a group consisting of, for example, personal information of the client 10, ID of the client 10 and the browsing history of the client 10. However, this embodiment is not limited to the above When the verification module 140 makes a verification fingerprint renewal request while transmitting a first integrity value H1 to the verification database 150, the second acknowledgement Ack2 can be a response thereto. In other words, the verification database 150 can first store the second data eigenvalue I2, the first verification fingerprint Fp1, the request time T and inquirer information Ireq in the same record, and thereafter, receive the first integrity value H1 along with the verification fingerprint renewal request.

In this regard, "same record" can refer to storing as a plurality of label values linked to one original data Do. For example, the second data eigenvalue I2, the first verification fingerprint Fp1, the request time T, the inquirer information Ireq and the first integrity value H1 of the original data Do can be stored in the form of one row in each table. However, this embodiment is not limited to the above.

In this regard, the verification database 150 can store a first integrity value H1 in the same record in which a second data eigenvalue I2, a first verification fingerprint Fp1, a request time T and inquirer information Ireq are stored. In addition, the verification database 150 can transmit a second acknowledgement Ack2 to the verification module 140 to indicate that the first integrity value H1 has been stored in the same record as the second data eigenvalue I2, the first verification fingerprint Fp1, the request time T and the inquirer information Ireq. The verification module 140 can transmit a second acknowledgment Ack2 to the service module 110.

In addition, the verification module 140 can deliver a second data eigenvalue I2, a first verification fingerprint Fp1, a request time T, inquirer information Ireq and a first integrity value H1 to the verification database 150. The verification module 140 can receive a first acknowledgement Ack1 and a second acknowledgement Ack2 from the verification database 150.

A request time T can be a time at which the verification module 140 requests the verification database 150 to store the second data eigenvalue I2, the first verification fingerprint Fp1 and the inquirer information Ireq. Or the request time T can be a time at which the client 10 delivers a data access request to the system for verifying data access 100.

The request time T can be stored as one distinct value for one data access request. In other words, when the request time T is a time at which the data access request is identified, all of the above is possible.

A first acknowledgement Ack1 can be an acknowledgement to the request made by the verification module 140 to the verification database 150 to store the second data eigenvalue I2, the first verification fingerprint Fp1, the request time T and the inquirer information Ireq.

In other words, the verification database 150 can transmit a first acknowledgement Ack1 to the verification module 140 after storing the second data eigenvalue I2, the first verification fingerprint Fp1, the request time T and the inquirer information Ireq. The first acknowledgement Ack1 can refer to the success of storing the second data eigenvalue I2, the first verification fingerprint Fp1, the request time T and the inquirer information Ireq. However, this embodiment is not limited to the above.

The verification database 150 can store a second data eigenvalue I2, a first verification fingerprint Fp1, a request time T, inquirer information Ireq and a first integrity value H1 of the original data Do in the same record.

The verification database 150 can be a standard storage location that can store data. Or the verification database 150 can be implemented in the form of a standard storage server or a block chain system. However, this embodiment is not limited to the above.

The watermarking module 160 can generate a first verification data Dv1 by inserting a first verification fingerprint Fp1 into the original data Do together with the data module 120. A more detailed description of the watermarking module 160 will be provided subsequently.

Figure 3:
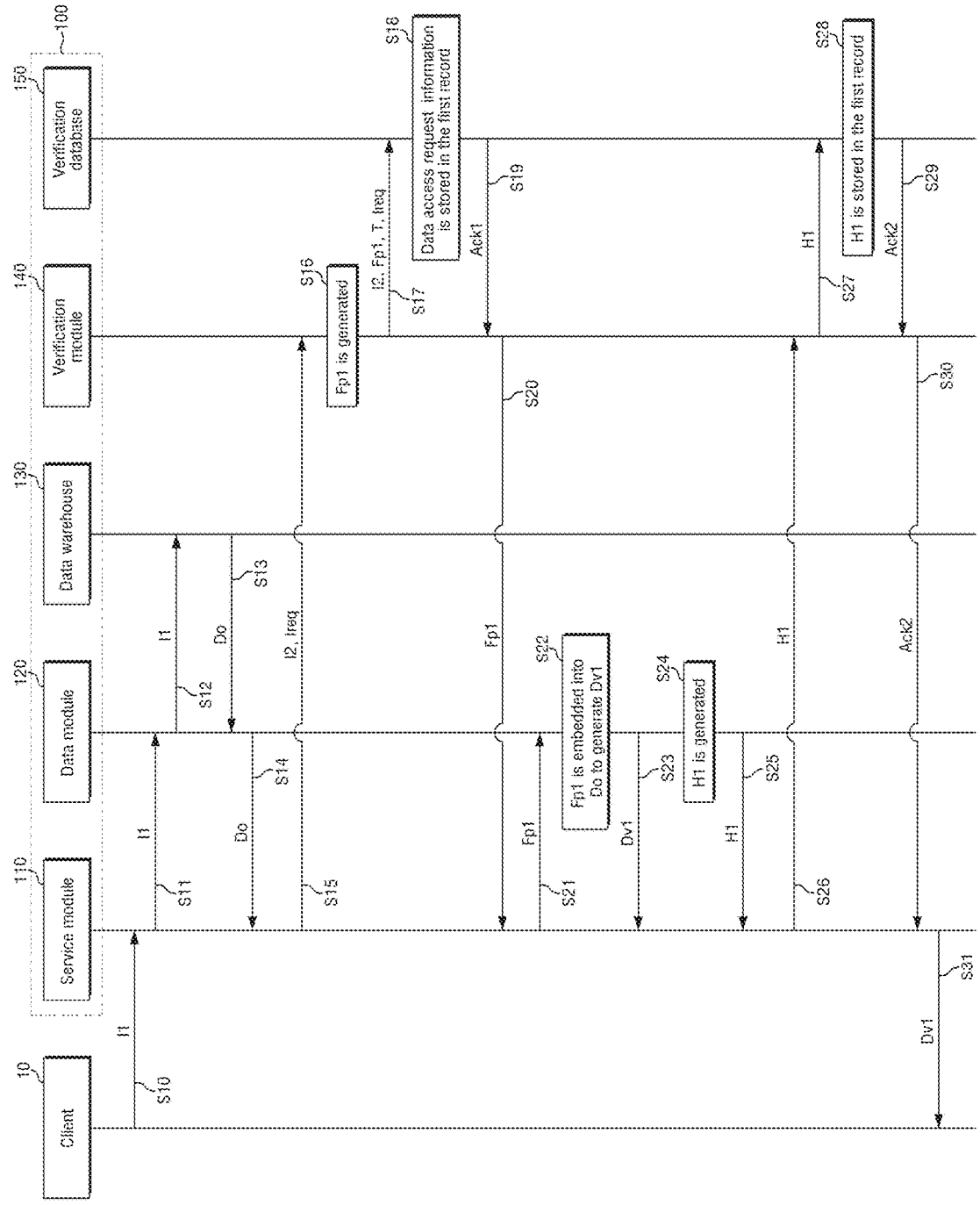
FIG. 3 is a flow chart displaying the operation of each module of the system for embedding a digital verification fingerprint according to some embodiments of the described technology.

FIG. 3 is a flow chart displaying the operation of each module of the system for verifying data access according to some embodiments of the present inventive concept.

With reference to FIG. 2 and FIG. 3, first, the client 10 transmits a first data eigenvalue I1 to the service module 110. In this regard, the client 10 can transmit a data access request together.

Then, the service module 110 transmits the first data eigenvalue I1 to the data module 120 in S11.

Then, the data module 120 transmits the first data eigenvalue I1 to the data warehouse 130 in S12.

Then, the data warehouse 130 transmits the original data Do corresponding to the first data eigenvalue I1 to the data module 120 in S13.

Then, the data module 120 transmits the original data Do to the service module 110 in S14.

Then, the service module 110 transmits a second data eigenvalue I2 and inquirer information Ireq to the verification module 140 in S15. In this regard, the second data eigenvalue I2 can be a value corresponding to the first data eigenvalue I1. For example, the second data eigenvalue I2 can be a value that is identical to the first data eigenvalue I1, or a key value or a hashed value of the original data Do. However, this embodiment is not limited to the above. The service module 110 can generate a second data eigenvalue I2 based on the first data eigenvalue I1. In addition, the service module 110 can generate inquirer information Ireq based on the information of the client 10. In this regard, the inquirer information Ireq can be received from the client 10, or in the case of a client 10 that has already been registered, the service module 110 may have the inquirer information Ireq.

Then, the verification module 140 generates a first verification fingerprint Fp1. The first verification fingerprint Fp1 can be randomly generated. The size of the first verification fingerprint Fp1 can be predetermined. However, this embodiment is not limited to the above.

Then, the verification module 140 transmits the second data eigenvalue I2, the first verification fingerprint Fp1, the request time T and the inquirer information Ireq to the verification database 150 in S17. In this regard, the request time T can be a time at which the service module 110 receives data access from the client 10. In such case, the request time T can be generated by the service module 110 and transmitted to the verification module 140.

Or the request time T can be a time at which the verification module 140 transmits the second data eigenvalue I2, the first verification fingerprint Fp1 and the inquirer information Ireq to the verification database 150. In such case, the request time T can be generated by the verification module 140.

Then, the verification database 150 stores data access request information in a first record in S18. In this regard, the data access request information can include a second data eigenvalue I2, a first verification fingerprint Fp1, a request time T and inquirer information Ireq. All of the data access information stored in the first record can be stored in correspondence with the original data Do so that it can identify the original data Do. In this regard, "first record" simply refers to a specific record of a plurality of records, and is not limited to the foremost record.

Then, the verification database 150 transmits a first acknowledgement Ack1 to the verification module 140 in 519. The first acknowledgement Ack1 can be an acknowledgement to the data access request information being stored in the first record.

Then, the verification module 140 transmits the first verification fingerprint Fp1 to the service module 110 in 520. The verification module 140 can transmit the first verification fingerprint Fp1 to the service module 110 after receiving the first acknowledgement Ack1 from the verification database 150. If the first verification fingerprint Fp1 is transmitted to the service module 110 before the data access request information is stored in the verification database 150, any forthcoming verifications may not be successfully completed. Therefore, the period at which the verification module 140 transmits the first verification fingerprint Fp1 to the service module 110 must be after the verification database 150 transmits the first acknowledgement Ack1 to the verification module 140.

Then, the service module 110 transmits the first verification fingerprint Fp1 to the data module 120 in S21.

Then, the data module 120 generates a first verification data Dv1 by embedding the first verification fingerprint Fp1 to the original data Do in S22. The first verification data Dv1 can be completely identical to the original data Do with the exception of the portion in which the first verification fingerprint Fp1 is inserted.

Then, the data module 120 transmits the first verification data Dv1 to the service module 110 in S23.

Then, the data module 120 generates a first integrity value H1 by hashing the first verification data Dv1 in S24.

Steps S23 and S24 above were described as consecutive steps, however, this embodiment is not limited to the above. Steps S23 and S24 may be performed in parallel.

Then, the data module 120 transmits the first integrity value H1 to the service module 110 in S25.

Then, the service module 110 transmits the first integrity value H1 to the verification module 140 in S26.

Then, the verification module 140 transmits the first integrity value H1 to the verification database 150 in S27.

Then, the verification database 150 stores the first integrity value H1 in the first record in S28. The first record can be renewed by adding the first integrity value H1. Therefore, the second data eigenvalue I2, the first verification fingerprint Fp1, the request time T, the inquirer information Ireq and the first integrity value H1 can be stored in the first record.

Then, the verification database 150 transmits a second acknowledgement Ack2 to the verification module 140. The second acknowledgement Ack2 can be an acknowledgement of the first record being renewed by adding the first integrity value H1 to the first record.

Then, the verification module 140 transmits the second acknowledgement Ack2 to the service module 110 in S30.

Then, the service module 110 provides the first verification data Dv1 to the client 10 after receiving the second acknowledgement Ack2 in S31.

FIG. 3 above is merely one exemplary sequence of operation of modules, and this embodiment is not limited to the above. Therefore, the system for verifying data access according to some embodiments of the present inventive concept may operate in a different sequence and method to FIG. 3.

Figures 4, 5:
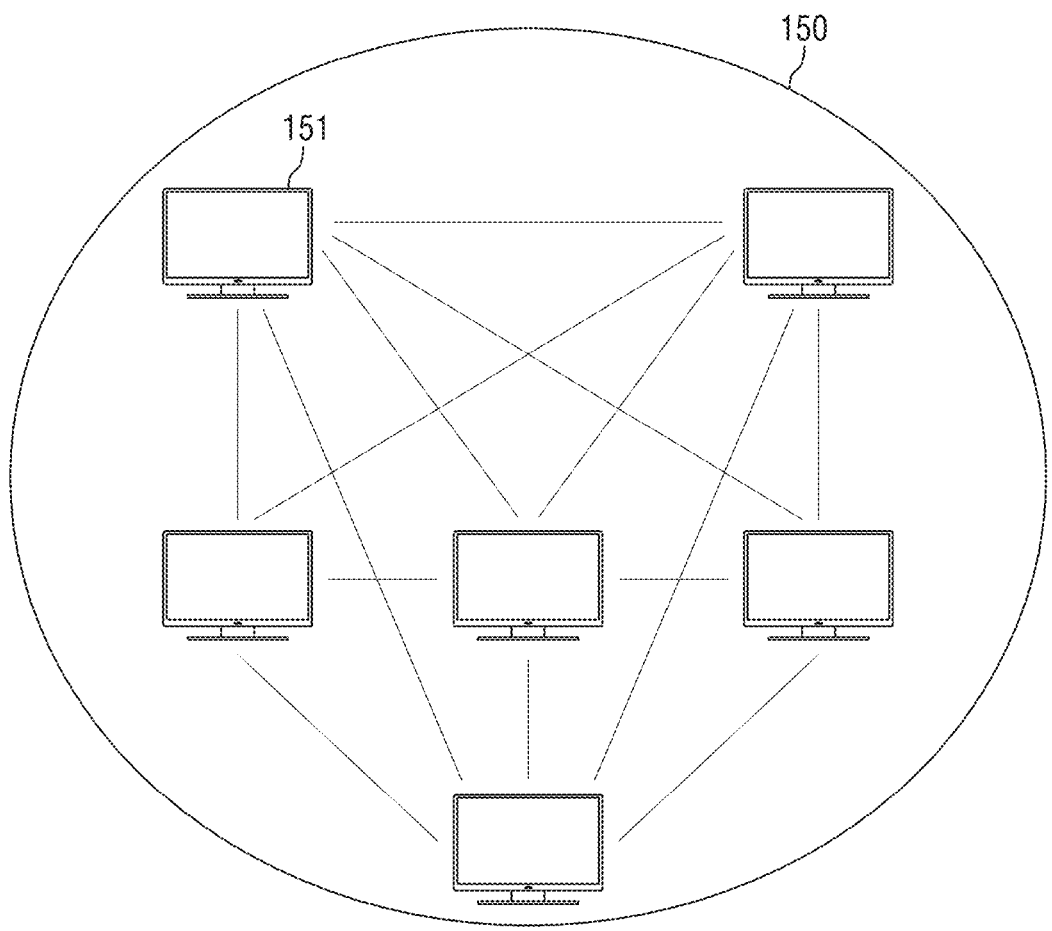
FIG. 4 is a conceptual diagram illustrating a verification database of FIG. 2.
FIG. 5 is an exemplary view illustrating a table stored on the verification database.

FIG. 4 is a conceptual diagram illustrating the verification database of FIG. 2.

With reference to FIG. 4, the verification database 150 can be implemented in a block chain form, rather than as a simple storage server.

Specifically, the verification database 150 can include a plurality of nodes (151). The verification database 150 can store a record comprising the second data eigenvalue I2, the first verification fingerprint Fp1, the request time T, the inquirer information Ireq and the first integrity value H1 of the above-described original data Do in the form of a block. The block can include a block header and a transaction, and the record can be included in the transaction. The integrity of the block header can be checked by storing the hash value of the transaction.

The verification database 150 can generate a block chain code by combining the block generated as above to an existing completed block chain code. This block chain code can each be stored in a plurality of nodes (151). Accordingly, even if a block chain code stored in any one of the plurality of nodes (151) is changed, a block chain code stored in the remaining nodes (151) exists, and thus, the verification database 150 can safely store the stored record so that it is not changed.

Particularly in the event of an attack to change data by hacking the verification database 150, the change of the stored record can be prevented unless all of the plurality of nodes (151) of the verification database 150 are attacked. Accordingly, the verification database 150 can achieve improved security and reliability, and the system for verifying data access according to some embodiments of the present inventive concept can also have improved reliability.

FIG. 5 is an exemplary view illustrating a table stored in the verification database of FIG. 2.

With reference to FIG. 2 and FIG. 5, the verification database 150 can include a table within it. The table of the verification database 150 can include data eigenvalues, verification fingerprints, inquirer information, request times and integrity values corresponding to the original data Do. In other words, for example, the above-described second data eigenvalue I2, the first verification fingerprint Fp1, the inquirer information Ireq, the request time T and the first integrity value H1 can each correspond to the same.

The table of the verification database 150 can include data eigenvalues, verification fingerprints, inquirer information, request times and integrity values in one row. Through which, linked information can be included in the form of a label in one original data Do. Through which, verification data can be verified by verifying whether any forthcoming verification fingerprint and integrity value extracted from one verification data are located in the same record, i.e., the same row.

In the description above, the same record was explained as information located in the same row of the table. However, this embodiment is not limited to the above. The same record can comprise same columns in the table, or composed in another form. In other words, if information is arranged for the data eigenvalue, the verification fingerprint, the inquirer information, the request time and the integrity value to identify one original data, the arrangement of the information does not matter.

Figure 6:
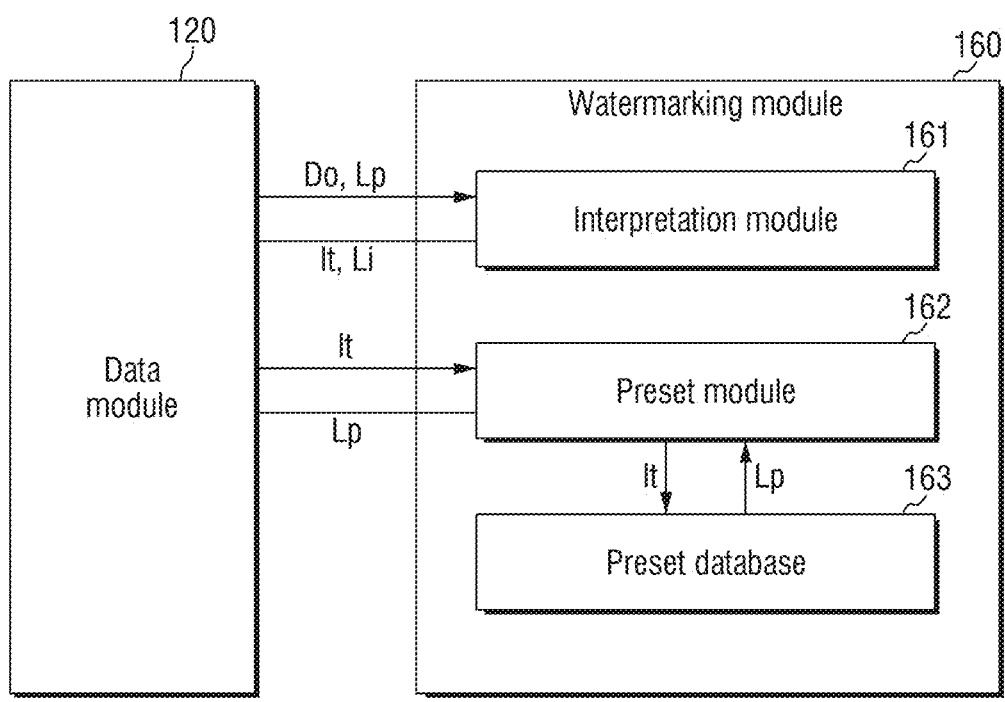
FIG. 6 is a block diagram illustrating a data module and a watermarking module.

FIG. 6 is a block diagram illustrating the data module and the watermarking module of FIG. 2.

With reference to FIG. 6, the watermarking module 160 can include an interpretation module 161, a preset module 162 and a preset database 163.

The interpretation module 161 can determine the data type of the original data Do, and interpret the input-enabled location Li. Specifically, the interpretation module 161 can receive original data Do and an embedding location preset list Lp from the data module 120. The interpretation module 161 can transmit the data type information It and the input-enabled location Li to the data module 120.

The preset module 162 can directly communicate with the preset database 163 to send a predetermined embedding location preset list Lp for each data type. The preset module 162 can receive data type information It from the data module 120. The preset module 162 can transmit the embedding location preset list Lp to the data module 120.

The preset database 163 can store the embedding location preset list Lp within it. The preset database 163 can receive data type information It from the preset module 162, and transmit an embedding location preset list Lp corresponding to the data type information It to the preset module 162.

Figure 7:
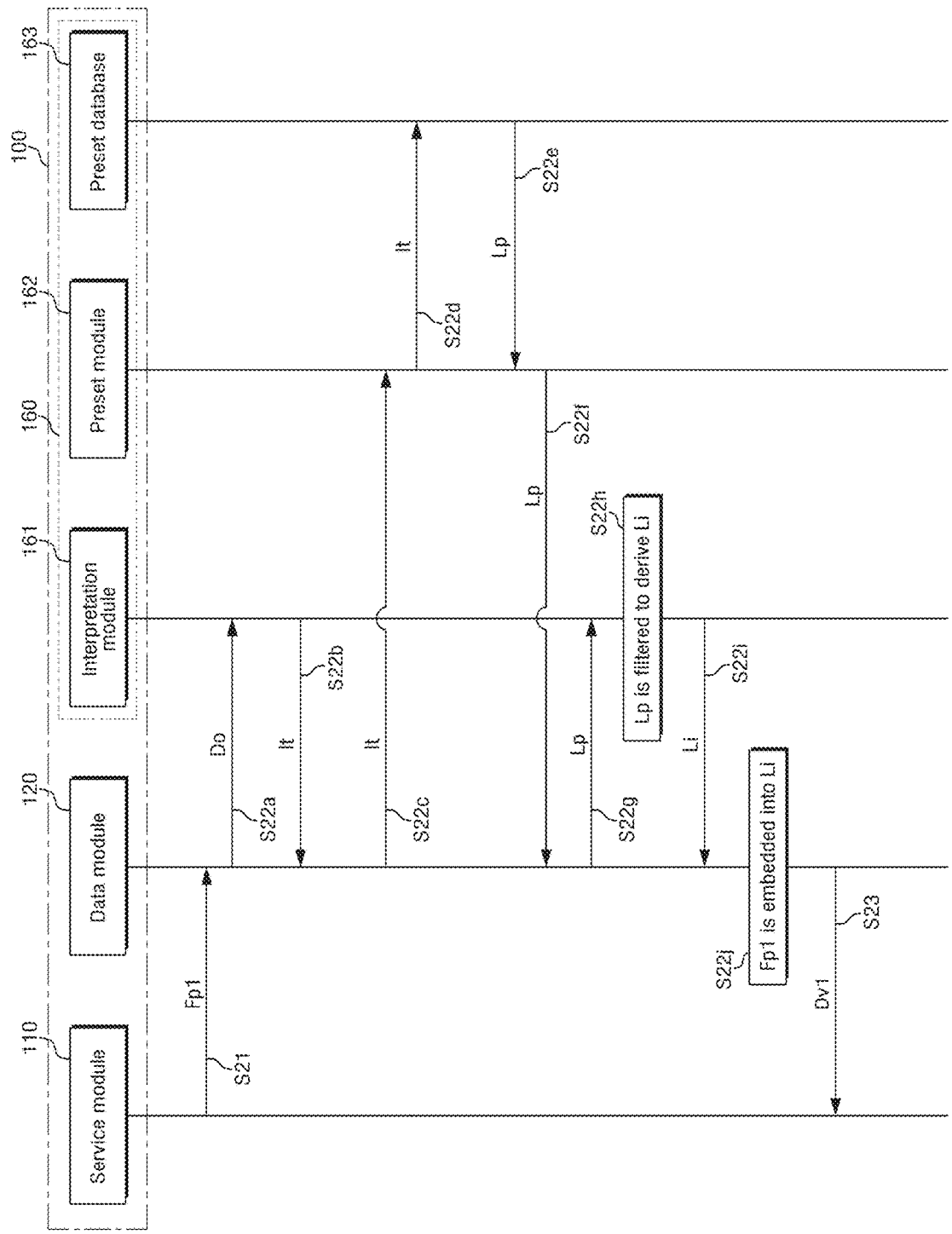
FIG. 7 is a flow chart displaying an operation of the data module and the watermarking module.

FIG. 7 is a flow chart displaying the operation of the data module and the watermarking module of FIG. 6.

With reference to FIG. 6 and FIG. 7, the service module 110 transmits a first verification fingerprint Fp1 to the data module 120 in S21. This step can be the same as Step S21 of FIG. 3.

Then, the data module 120 transmits an original data Do to the interpretation module 161 in S22a.

Then, the interpretation module 161 analyzes the data type of the original data Do to transmit the data type information It to the data module 120 in S22b.

Then, the data module 120 transmits the data type information It to the preset module 162 in S22c.

Then, the preset module 162 transmits the data type information It to the preset database 163 in S22d.

Then, the preset database 163 sends an embedding location preset list Lp corresponding to the received data type information It to the preset module 162 in S22e. An embedding location preset list Lp corresponding to various types of data type information It may already be stored in the preset database 163.

Then, the preset module 162 transmits the embedding location preset list Lp to the data module 120 in S22f.

Then, the data module 120 transmits the embedding location preset list Lp to the interpretation module 161 in S22g.

Then, the interpretation module 161 filters the embedding location preset list Lp to derive an input-enabled location Li (S22h).

Then, the interpretation module 161 delivers the input-enabled location Li to the data module 120 in S22i.

Then, the data module 120 embeds a first verification fingerprint Fp1 to the input-enabled location Li of the original data Do in S22j. Through which, a first verification data 9Dv1) can be generated.

Then, the data module 120 transmits the first verification data Dv1 embedded with the first verification fingerprint Fp1 to the service module 110 in S23. This step can be the same as S23 of FIG. 3.

FIG. 7 above is merely one exemplary sequence of operation of modules, and this embodiment is not limited to the above. Therefore, the system for verifying data access according to some embodiments of the present inventive concept may operate in a different sequence and method to FIG. 7.

FIG. 8 is an exemplary view illustrating the system for verifying data access according to some embodiments of the present inventive concept converting original data into verification data.

With reference to FIG. 6 to FIG. 8, the original data Do can be indicated as a hex code, i.e., a hexadecimal. The original data Do can include an input-enabled location Li derived by the interpretation module 161. The data module 120 can embed a first verification fingerprint Fp1 into the input-enabled location Li. The first verification fingerprint Fp1 can also be indicated as a hex code. However, this embodiment is not limited to the above.

When a first verification fingerprint Fp1 is embedded, the original data Do can be converted into a first verification data Dv1. The first verification data Dv1 can be identical to the original data Do in its entirety, with the exception of the first verification fingerprint Fp1.

Figure 9:
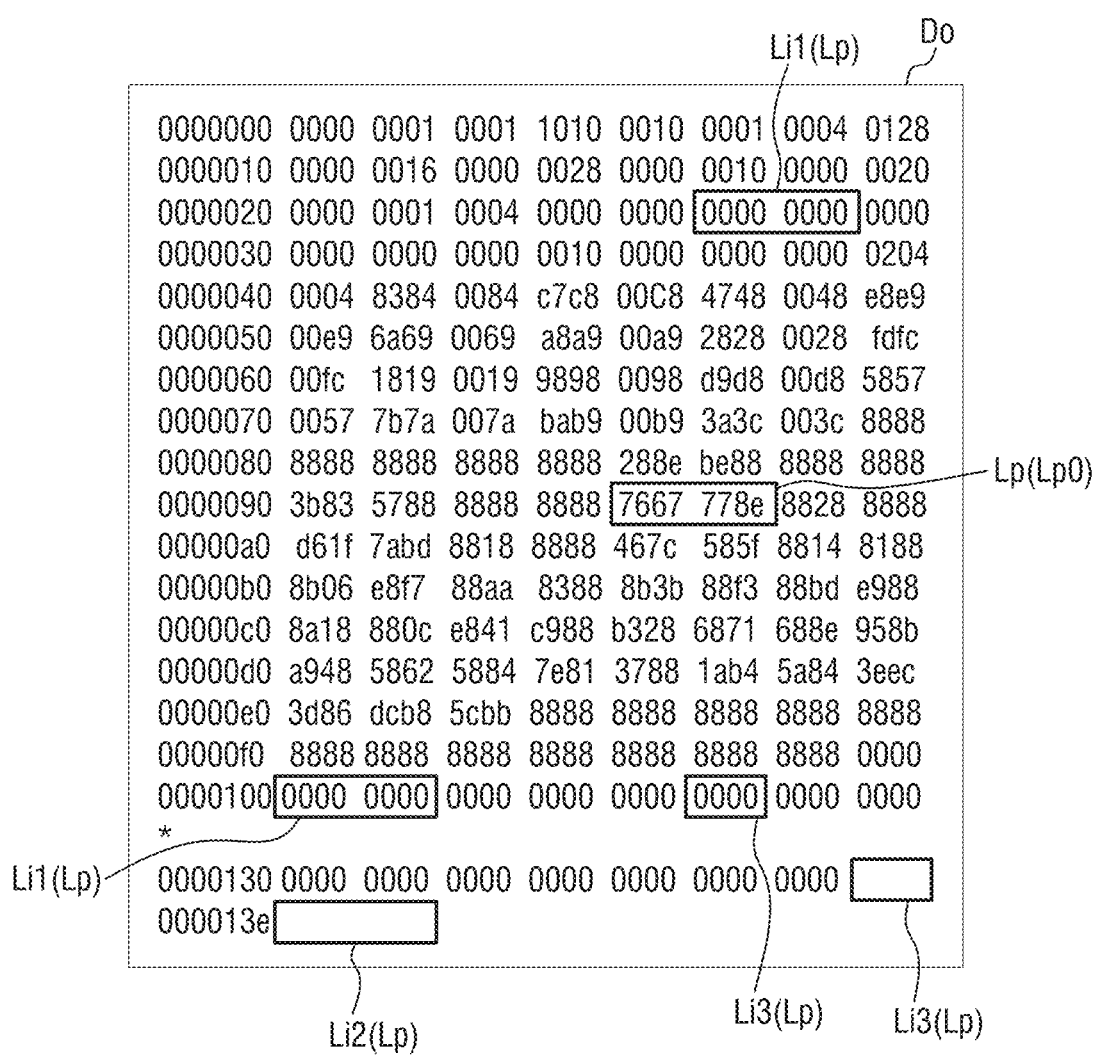
FIG. 9 is a diagram illustrating an embedding location preset list and an input-enabled location of the system for embedding a digital verification fingerprint according to some embodiments of the described technology.

FIG. 9 is an illustration illustrating the embedding location preset list and the input-enabled location of the system for verifying data access according to some embodiments of the present inventive concept.

With reference to FIG. 6 to FIG. 9, the interpretation module 161 can select the input-enabled location Li based on the received embedding location preset list Lp.

The embedding location preset list Lp can include a plurality of areas. The content of the original data Do may not be damaged for at least a portion of the plurality of areas included in the embedding location preset list Lp even if the first verification fingerprint Fp1 is embedded. However, there may be areas where significant values exist within the embedding location preset list Lp. Therefore, the interpretation module 161 can filter this portion to select the final input-enabled location Li.

An input-unenabled area Lp0 of the embedding location preset list Lp of FIG. 9 is an area where a significant value exists because it is written with the code "7667 778e." Thus, although it is included in the embedding location preset list Lp, it cannot be selected as the final input-enabled location Li.

The input-enabled location Li can include a substitutable area Li1, an insertable area Li2 and a combined area Li3. A substitutable area Li1 is an area in which insignificant values, such as "0000 0000" exist, and the first verification fingerprint Fp1 can be substituted and inserted.

An insertable area Li2 can be an area where no values exist in its original state. In the insertable area Li2, the first verification fingerprint Fp1 may be directly inserted without the need of being substituted. In such case, the size of the first verification data Dv1 may become larger than the original data Do according to the insertion of the first verification fingerprint Fp1 into the insertable area Li2.

A combined area Li3 can be an area in which the substitutable area Li1 and the insertable area Li2 are combined. The size of the first verification fingerprint Fp1 may be predetermined. However, the size of the plurality of areas included in the embedding location preset list Lp may not be predetermined. In other words, the size of the plurality of areas included in the embedding location preset list Lp can be sufficiently large for the first verification fingerprint Fp1 to be inserted, however, it can also be too small for the first verification fingerprint Fp1 to be inserted.

If a portion of the plurality of areas included in the embedding location preset list Lp is too small for the first verification fingerprint Fp1 to be inserted, the interpretation module 161 can generate a larger area by being merged together. In this regard, the merged area generated by this merging can be sufficiently large for the first verification fingerprint Fp1 to be inserted.

The merged area generated by the merging can be classified into an area merging substitutable areas Li1, an area merging insertable areas Li2 and an area merging a substitutable area Li1 with an insertable area Li2. Among which, the area merging a substitutable area Li1 with an insertable area Li2 can be defined as a combined area Li3.

Therefore, the combined area Li3 can comprise two or more areas, and at least one of each sub-area can be a substitutable area Li1, and at least one of each sub-area can be an insertable area Li2.

The data module 120 can insert the first verification fingerprint Fp1 into one or more original data. In other words, the first verification fingerprint Fp1 can be repeatedly inserted into original data Do by the data module 120.

Figure 10:
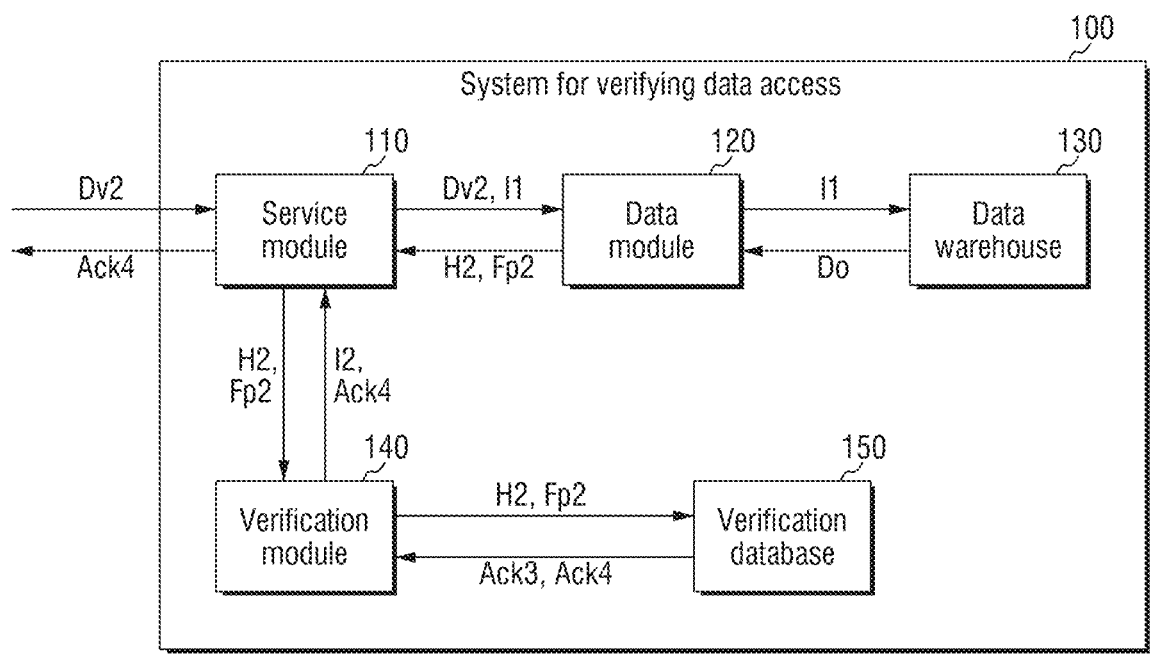
FIG. 10 is a block diagram illustrating in detail, the system for embedding a digital verification fingerprint access of FIG. 1 verifying verification data.

FIG. 10 is a block diagram illustrating in detail, the system for verifying data access of FIG. 1 verifying verification data.

With reference to FIG. 10, the service module 110 can receive a second verification data Dv2 from the client 10 of FIG. 1, and send a fourth acknowledgement (Ack4). In this regard, the second verification data Dv2 can be a verification data owned by the client 10 of FIG. 1. A fourth acknowledgement (Ack4) is an acknowledgement of the second verification fingerprint Fp2 and the second integrity value H2 being located in the same record in the verification database 150, and can be an acknowledgement of the second verification data Dv2 being verified.

The service module 110 can transmit the second verification data Dv2 and the first data eigenvalue I1 to the data module 120. The data module 120 can extract the second integrity value H2 and the second verification fingerprint Fp2 to transmit to the service module 110.

The first data eigenvalue I1 can be the same value as the first data eigenvalue I1 of FIG. 2. The first data eigenvalue I1 can be a key value corresponding to the original data Do. The service module 110 can receive the second data eigenvalue I2 from the verification module 140 to transmit the first data eigenvalue I1 corresponding to the second data eigenvalue I2 to the data module 120.

The second integrity value H2 can be a value that is generated by the data module 120 by hashing the second verification data Dv2. The second integrity value H2 can use the same hash function as the hash function for generating the first integrity value H1 of FIG. 2.

A second verification fingerprint Fp2 can be extracted by the data module 120 by contrasting the second verification data Dv2 and the original data Do. The second verification fingerprint Fp2 can be the portion that is different between the second verification data Dv2 and the original data Do.

The data module 120 can transmit the first data eigenvalue I1 to the data warehouse 130, and receive the original data Do corresponding to the first data eigenvalue I1.

The service module 110 can transmit the second integrity value H2 and the second verification fingerprint Fp2 to the verification module 140, and receive the second data eigenvalue I2 and the fourth acknowledgement (Ack4). The second eigenvalue I2 can be the same value as the second data eigenvalue I2 of FIG. 2. The second data eigenvalue I2 can be the value of sending the second data eigenvalue I2 in the same record to the verification module 140 after the verification database 150 receives the second integrity value H2. The service module 110 can transmit the first data eigenvalue I1 corresponding to the received second data eigenvalue I2 to the data module 120.

The verification module 140 can transmit the second integrity value H2 and the second verification fingerprint Fp2 to the verification database 150, and receive a third acknowledgement Ack3 and a fourth acknowledgement Ack4. In this regard, the third acknowledgement Ack3 can be an acknowledgement of the presence of a record corresponding to the second integrity value H2. The fourth acknowledgement Ack4 can be an acknowledgement of the second integrity value H2 and the second verification fingerprint Fp2 being in the same record.

The verification database 150 can receive the second integrity value H2 and the second verification fingerprint Fp2 from the verification module 140. The verification database 150 can transmit the third acknowledgement Ack3 and the fourth acknowledgement Ack4 to the verification module 140.

Figure 11:
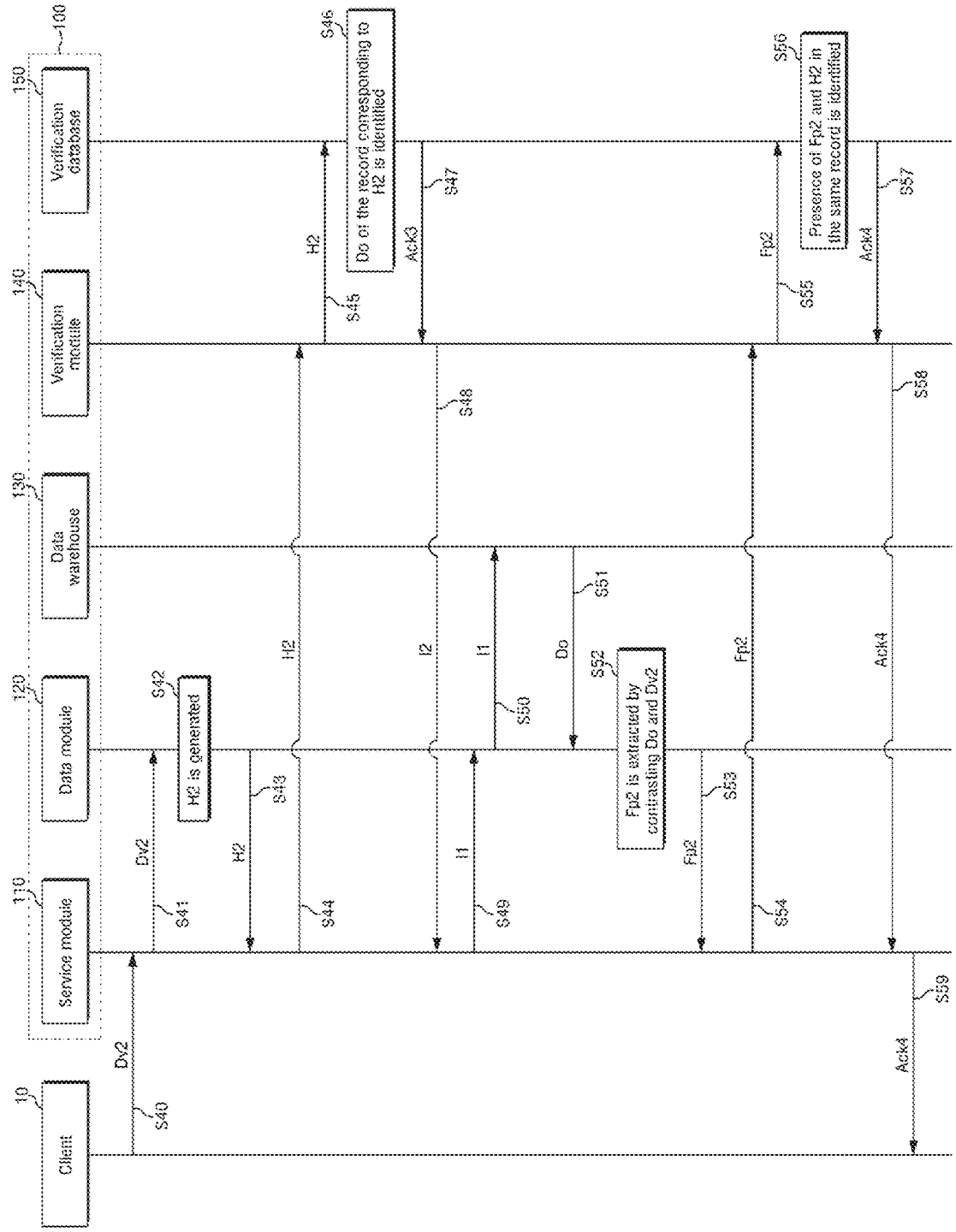
FIG. 11 is a flow chart displaying an operation of each module related to the system for embedding a digital verification fingerprint according to some embodiments of the described technology verifying verification data.

FIG. 11 is a flow chart displaying the operation of each module related to the system for verifying data access according to some embodiments of the present inventive concept verifying the verification data.

With reference to FIG. 11, first, the client 10 transmits the second verification data Dv2 to the service module 110 in S40.

Then, the service module 110 transmits the second verification data Dv2 to the data module 120 in S41.

Then, the data module 120 hashes the second verification data Dv2 to generate the second integrity value H2 in S42. If the second verification data Dv2 is identical to the above-described first verification data Dv1, the second integrity value H2 can be identical to the first integrity value H1.

Then, the data module 120 transmits the second integrity value H2 to the service module 110 in S43.

Then, the service module 110 transmits the second integrity value H2 to the verification module 140 in S44.

Then, the verification module 140 transmits the second integrity value H2 to the verification database 150 in S45.

Then, the verification database 150 checks whether there is a record corresponding to the second integrity value H2, and checks the original data corresponding to the second integrity value H2 in S46. If the second integrity value H2 is identical to the above-described first integrity value H1, the above-described first record and the original data Do corresponding to the first record can be identified. In addition, the second data eigenvalue I2 corresponding to the first record can be identified.

Then, the verification database 150 transmits the third acknowledgement Ack3 to the verification module 140 in S47. If the first record and the original data Do corresponding to the first record are identified by the verification database 150, the third acknowledgement Ack3 can be an acknowledgement of the identification of the first record and the original data Do corresponding to the first record. In addition, it can also be an acknowledgement of the identification of the second data eigenvalue I2 corresponding to the first record.

Then, the verification module 140 transmits the identified second data eigenvalue I2 to the service module 110 in S48.

Then, the service module 110 transmits the first data eigenvalue I1 to the data module 120 in S49. In this regard, the first data eigenvalue I1 can be identical to the second data eigenvalue I2, or a value corresponding to the second data eigenvalue I2. The first data eigenvalue I1 can be a key value corresponding to the original data Do. The service module 110 can receive the second data eigenvalue I2, and generate a first data eigenvalue I1 corresponding to the second data eigenvalue I2.

Then, the data module 120 transmits the first data eigenvalue I1 to the data warehouse 130 in S50.

Then, the data warehouse 130 transmits the original data Do to the data module 120 in S51. The original data Do can correspond to the first data eigenvalue I1.

Then, the data module 120 contrasts the original data Do with the second verification data Dv2 to extract a second verification fingerprint Fp2 in S52. In this regard, the second verification fingerprint Fp2 can be extracted by the difference between the original data Do and the second verification data Dv2. If the second verification data Dv2 is identical to the above-described first verification data Dv1, the second verification fingerprint Fp2 can be identical to the first verification fingerprint Fp1.

Then, the data module 120 transmits the extracted second verification fingerprint Fp2 to the service module 110 in S53.

Then, the service module 110 transmits the second verification fingerprint Fp2 to the verification module 140 in S54.

Then, the verification module 140 transmits the second verification fingerprint Fp2 to the verification database 150 in S55.

Then, the verification database 150 checks the presence of the second verification fingerprint Fp2 and the second integrity value H2 in the same record in S56. In this regard, if the second verification fingerprint Fp2 and the second integrity value H2 are each identical to the first verification fingerprint Fp1 and the first integrity value H1, they can exist in the same record, which is the first record.

Then, the verification database 150 transmits a fourth acknowledgement Ack4 to the verification module 140 in S57. In this regard, the fourth acknowledgement Ack4 can be an acknowledgement of the presence of the second verification fingerprint Fp2 and the second integrity value H2 in the same record. Through which, it can be verified that there is no falsification or modification to the second verification data Dv2 from the original data Do, and it is a lawfully browsed data.

Then, the verification module 140 transmits the fourth acknowledgement Ack4 to the service module 110 in S58.

Then, the service module 110 transmits the fourth acknowledgement Ack4 to the client 10 in S59.

FIG. 11 above is merely one exemplary sequence of operation of modules, and this embodiment is not limited to the above. Therefore, the system for verifying data access according to some embodiments of the present inventive concept may operate in a different sequence and method to FIG. 11.

In this embodiment, if the presence of the second integrity value H2 in the record is identified in Step S46, it can be primarily verified that there is no falsification or modification to the second verification data Dv2, and it is a lawfully browsed data.

However, since the second integrity value H2 is a hash value having a short length, Step S56 can be additionally performed to exclude the probability of having the same hash value in different verification data.

Through which, this embodiment can perform a more accurate and precise verification of data.

In addition, in this embodiment, it can be clearly ascertained when and who browsed the requested verification data based on information stored in the verification database 150. Accordingly, browsing that is restricted by data security can be easily and rapidly managed.

In addition, the access of data using an abnormal route by those without browsing rights of the data can also be clearly ascertained and controlled.

Below is a description of the data access verification method according to some embodiments of the present inventive concept with reference to FIG. 1 to FIG. 3, FIG. 6 to FIG. 9 and FIG. 12 to FIG. 16. The above-described embodiments and overlapping descriptions are omitted, or briefly outline.

Figure 12:
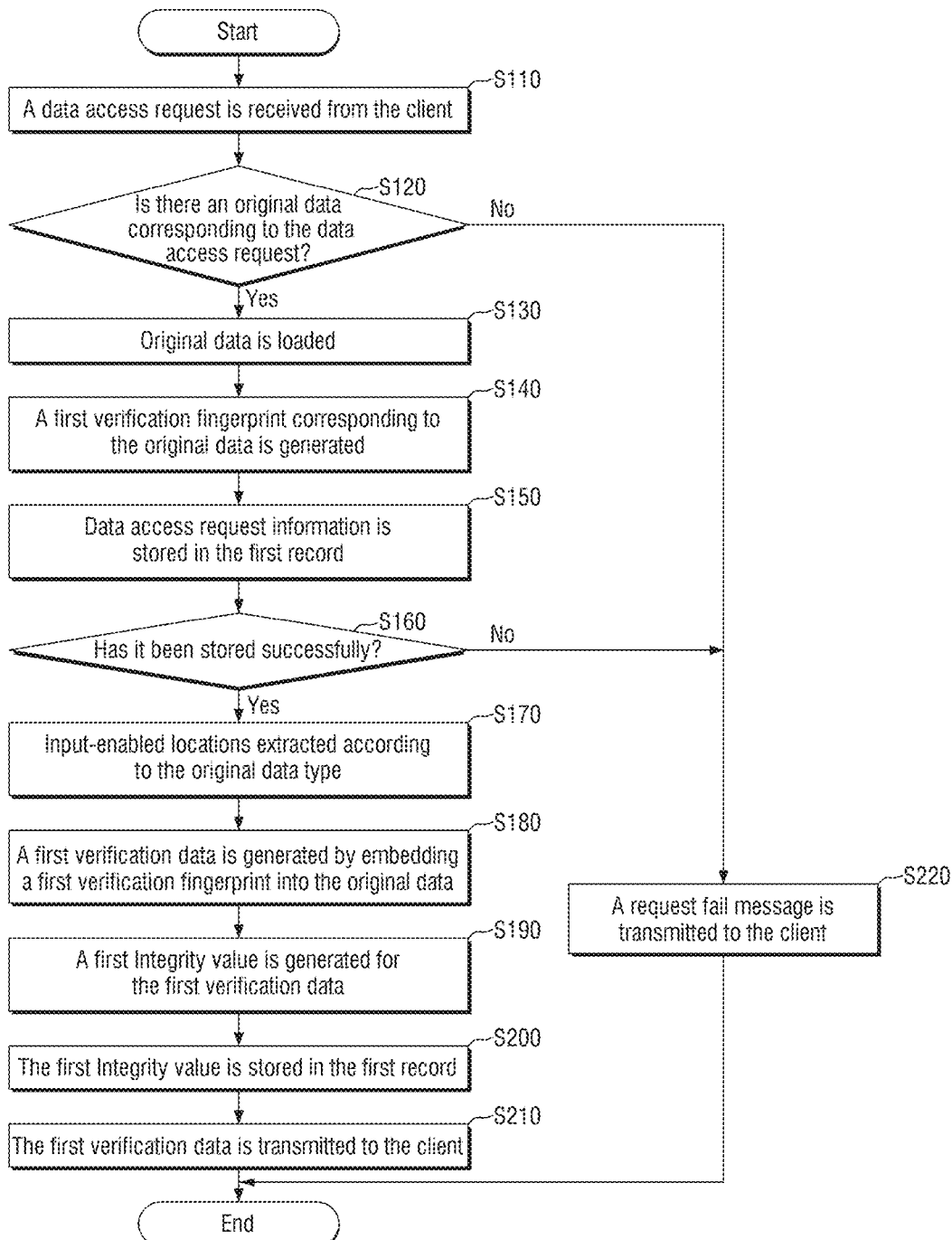
FIG. 12 is a flow chart illustrating a method for inserting a digital verification fingerprint according to some embodiments of the described technology.
Figure 13:
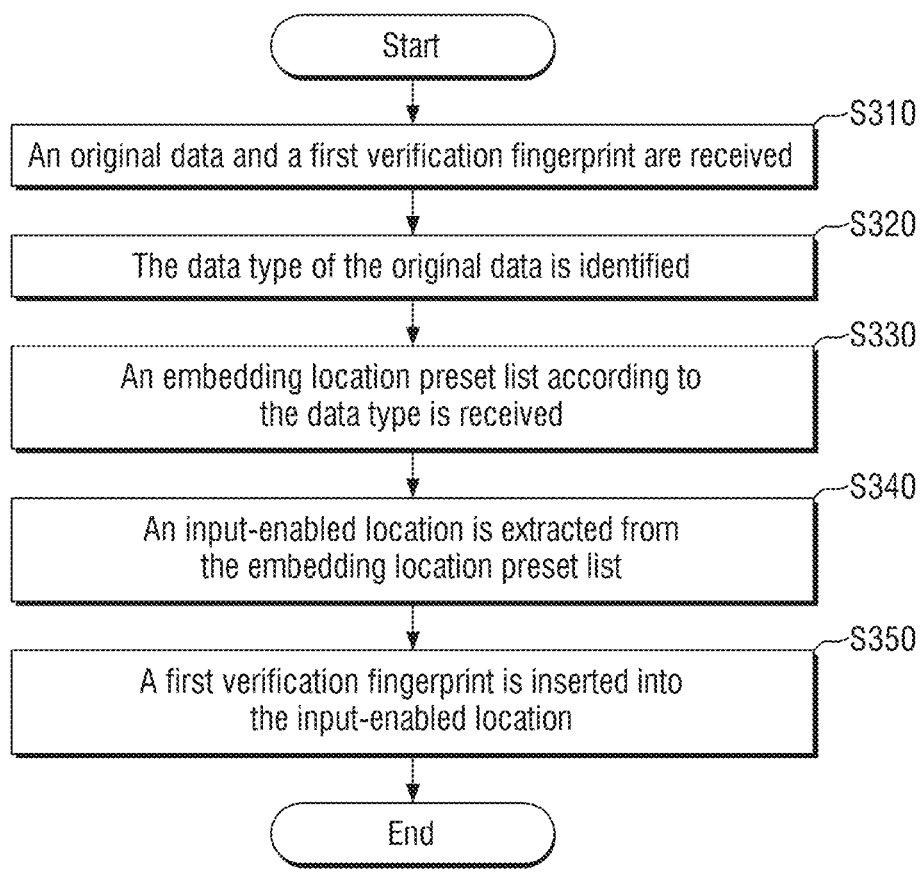
FIG. 13 is a flow chart illustrating in detail, the steps of extracting an embedding location of FIG. 12 and generating a first verification data.
Figure 14:
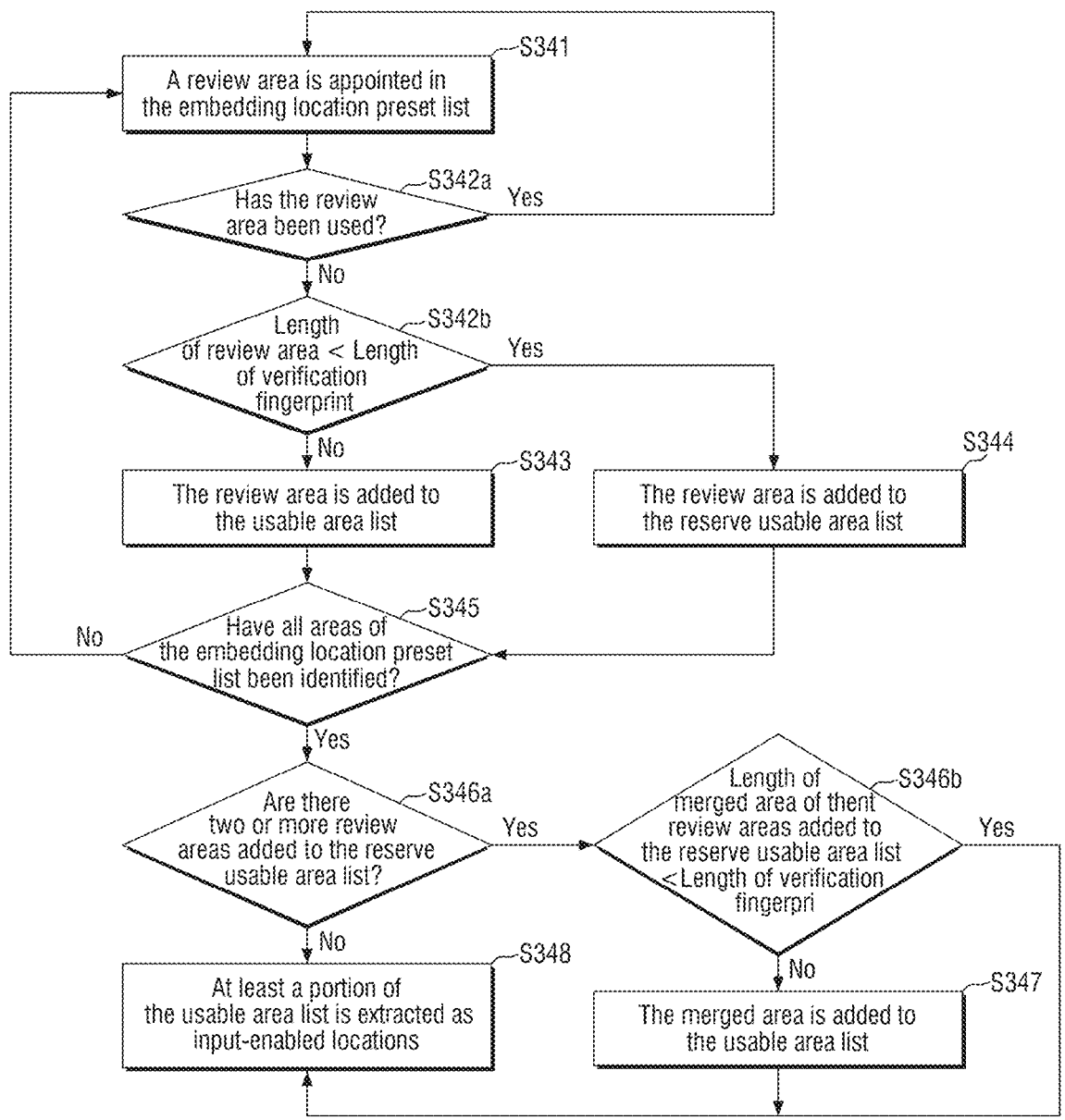
FIG. 14 is a flow chart illustrating in detail, the step of extracting an input-enabled location of FIG. 13.
Figure 15:
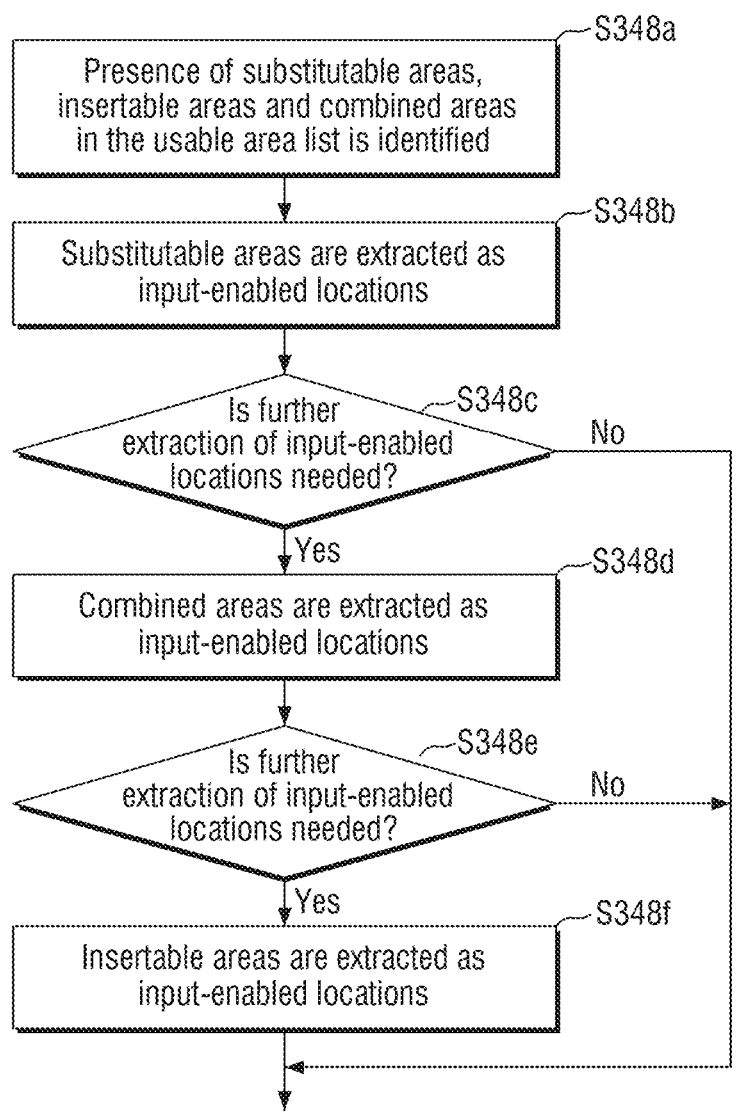
FIG. 15 is a flow chart illustrating in detail, the step of extracting at least a portion of a usable area list of FIG. 14 as an input-enabled location.
Figure 16:
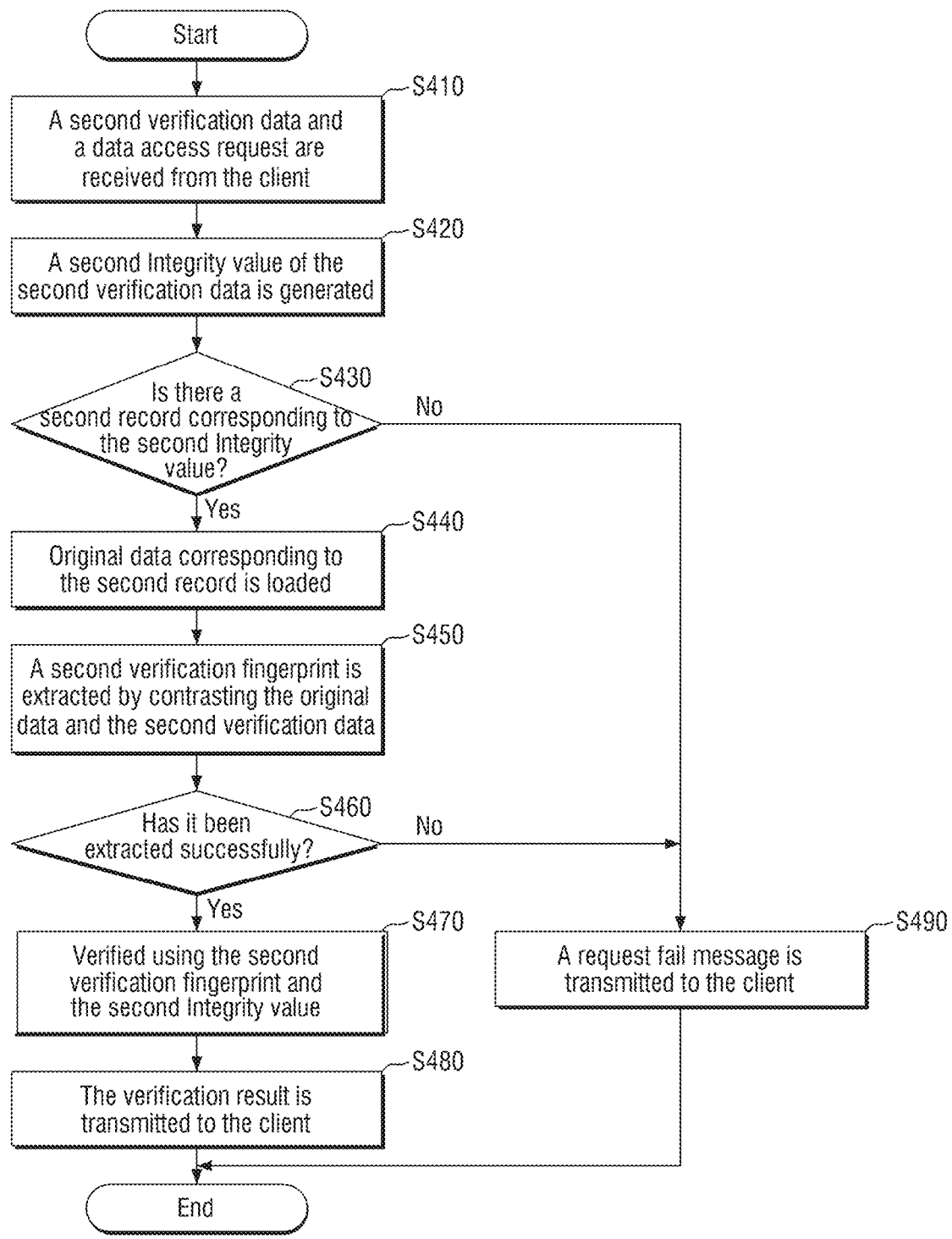
FIG. 16 is a flow chart illustrating the verification of verification data in the method for inserting a digital verification fingerprint according to some embodiments of the described technology.

FIG. 12 is a flow chart illustrating the data access verification method according to some embodiments of the present inventive concept, and FIG. 13 is a flow chart illustrating in detail, the steps of extracting the embedding location, and generating the first verification data of FIG. 12. FIG. 14 is a flow chart illustrating in detail, the step of extracting the input-enabled location of FIG. 13, and FIG. 15 is a flow chart illustrating in detail, the step of extracting at least a portion of the usable area list in FIG. 14 as an input-enabled location. FIG. 16 is a flow chart illustrating the verification of verification data in the data access verification method according to some embodiments of the present inventive concept.

With reference to FIG. 12, data access request is received from the client in S110.

Specifically, with reference to FIG. 1 to FIG. 3, the client 10 can transmit a data access request, while transmitting the first data eigenvalue I1 to the system for verifying data access 100. The first data eigenvalue I1 can be a value that can identify the original data requested by the client 10.

Again, with reference to FIG. 12, the presence of original data corresponding to the data access request is determined in S120.

Specifically, with reference to FIG. 1 to FIG. 3, the data warehouse 130 can determine the presence of an original data Do corresponding to the first data eigenvalue I1. If there is no corresponding original data Do, a request fail message is transmitted to the client in S220.

Again, with reference to FIG. 12, if there is original data corresponding to the first data eigenvalue, the original data is loaded in S130.

Specifically, with reference to FIG. 1 to FIG. 3, the data warehouse 130 can send the original data Do corresponding to the first data eigenvalue I1 to the data module 120.

Again, with reference to FIG. 12, a first verification fingerprint Fp1 corresponding to the original data is generated in S140.

Specifically, with reference to FIG. 1 to FIG. 3, the first verification fingerprint Fp1 can be generated by the verification module 140. The first verification fingerprint Fp1 can be randomly generated. However, this embodiment is not limited to the above.

Again, with reference to FIG. 12, data access request information is stored in the first record in S150.

Specifically, with reference to FIG. 1 to FIG. 3, the verification database 150 stores data access request information in the first record. In this regard, the data access request information can include a second data eigenvalue I2, a first verification fingerprint Fp1, a request time T and inquirer information Ireq.

Again, with reference to FIG. 12, the success of storing the data access request information is determined in S160.

If the storage of the data access request information has failed, a request fail message is transmitted to the client in S220.

If the storage of the data access request information has succeeded, an input-enabled location according to the original data type is extracted in S170.

Specifically, with reference to FIG. 1 to FIG. 3, the data module 120 and the watermarking module 160 extracts an input-enabled location Li according to the original data type.

Again, with reference to FIG. 12, a first verification fingerprint is embedded into the original data to generate the first verification data in S180.

Specifically, with reference to FIG. 1 to FIG. 3, the data module 120 embeds a first verification data Dv1 into the original data Do to generate the first verification data Dv1.

Again, with reference to FIG. 12, the first integrity value for the first verification data is generated in S190.

Specifically, with reference to FIG. 1 to FIG. 3, the first integrity value H1 can be a value generated by the data module 120 by hashing the first verification data Dv1. The first integrity value H1 can be generated using a unidirectional hash function. For example, the first integrity value H1 can be generated using one or more of MD5, SHA-1 and SHA-2 (i.e., SHA-224, SHA-256, SHA-384 and SHA-512). However, this embodiment is not limited to the above.

Again, with reference to FIG. 12, the first integrity value is stored in the first record in S200.

Specifically, with reference to FIG. 1 to FIG. 3, the verification database 150 stores the first integrity value H1 in the first record in S28. The first record can be renewed by adding the first integrity value H1.

Again, with reference to FIG. 12, the first verification data is transmitted to the client in S210.

Specifically, with reference to FIG. 1 and FIG. 3, the service module 110 can transmit the first verification data Dv1 to the client 10 in response to the data access request.

Below is a detailed explanation of Steps S170 and S180 of FIG. 12 above, with reference to FIG. 2, FIG. 3, FIG. 6, FIG. 7 and FIG. 13.

With detailed reference to FIG. 13, an original data and a first verification fingerprint are received in S310.

Specifically, with reference to FIG. 2, FIG. 3, FIG. 6 and FIG. 7, the data module 120 can receive an original data Do and a first verification fingerprint Fp1.

Again, with reference to FIG. 13, the data type of the original data is identified in S320.

Specifically, with reference to FIG. 6 and FIG. 7, the interpretation module 161 receives the original data Do from the data module 120, and checks the data type of the original data Do. The interpretation module 161 sends the data type information It related to the data type of the original data Do to the data module 120.

Again, with reference to FIG. 13, an embedding location preset list according to the data type is received in S330.

Specifically, with reference to FIG. 6 and FIG. 7, the data module 120 transmits the data type information It to the preset module 162. The preset module 162 again transmits the data type information It to the preset database 163. The preset database 163 sends the embedding location preset list Lp corresponding to the data type information It stored in the database to the preset module 162. The preset module 162 transmits the embedding location preset list Lp to the data module 120.

Again, with reference to FIG. 13, an input-enabled location is extracted from the embedding location preset list in S340.

Specifically, with reference to FIG. 6 and FIG. 7, the data module 120 transmits the embedding location preset list Lp to the interpretation module 161. The interpretation module 161 extracts an input-enabled location Li from the areas of the embedding location preset list.

Again, with reference to FIG. 13, a first verification fingerprint is inserted into the input-enabled location in S350.

Specifically, with reference to FIG. 2 and FIG. 3, a first verification fingerprint Fp1 can be inserted into the original data Do by the data module 120 to generate a first verification data Dv1. The first verification fingerprint Fp1 can be inserted into an unused area of the original data Do to generate the first verification data Dv1 without damaging the content of the original data Do.

Below is a detailed explanation of Step S340 of FIG. 13 above, with reference to FIG. 6 to FIG. 9 and FIG. 14.

With detailed reference to FIG. 14, a review area is appointed in the embedding location preset list in S341.

Specifically, with reference to FIG. 6 and FIG. 9, the embedding location preset list Lp can include a plurality of separated areas. The interpretation module 161 can consecutively determine the entirety of the plurality of areas in the embedding location preset list Lp. In other words, the interpretation module 161 can appoint and determine certain areas of the embedding location preset list Lp as review areas, and then, consecutively appoint and determine the remaining areas also as review areas.

Again, with reference to FIG. 14, the use of a review area is determined in S342a. If the review area has been used, it cannot be used as a review area. Thus, a review area is appointed again in S341. If the review area has not been used, review of the review area can be continued.

Specifically, with reference to FIG. 6 and FIG. 9, an input-unenabled area Lp0 of the embedding location preset list Lp is an area in which a significant value exists because it is written with the code "7667 778e," and thus, had been included in the embedding location preset list Lp. However, it cannot be selected as a final input-enabled location Li. Therefore, in such case, it can be excluded from input-enabled locations Li.

Furthermore, the review of substitutable areas Li1, in which insignificant values, such as "0000 0000" exist, or insertable areas Li2, in which no values exist, can be continued.

Again, with reference to FIG. 14, it is determined whether the length of the review area is smaller than the length of the verification fingerprint in S342b.

Specifically, with reference to FIG. 6 and FIG. 9, the size of the first verification fingerprint Fp1 can be predetermined. However, the size of the plurality of areas included in the embedding location preset list Lp may not be predetermined. In other words, the size of the plurality of areas included in the embedding location preset list Lp can be sufficiently large for the first verification fingerprint Fp1 to be inserted, however, it can also be too small for the first verification fingerprint Fp1 to be inserted.

Again, with reference to FIG. 14, if the length of the review area is greater or equal to the length of the verification fingerprint, the review area is added to the usable area list in S343. In contrast, if the length of the review area is smaller than the length of the verification fingerprint, the review area is added to the reserve usable area list in S344.

Then, it is determined whether all areas of the embedding location preset list have been checked in S345. If not, the review area is appointed again in S341, and if all areas have been checked, the next step is performed.

Then, it is determined whether there are two or more review areas added to the reserve usable area list in S346a. If there are less than two review areas added to the reserve usable area list, at least a portion of the usable area list is immediately extracted as an input-enabled location in S348.

If there are two or more review areas added to the reserve usable area list, it is determined whether the length of a merged area combining the review areas added to the reserve usable area list is smaller than the length of the verification fingerprint in S346b.

If the length of the merged area combining the review areas added to the reserve usable area list is greater or equal to the length of the verification fingerprint, the merged area is added to the usable area list in S347.

If the length of the merged area combining the review areas added to the reserve usable area list is smaller than the length of the verification fingerprint, the merged area is not added to the usable area list.

Then, at least a portion of the usable area list is extracted as an input-enabled location in S348.

Specifically, with reference to FIG. 6 and FIG. 9, the interpretation module 161 can extract an input-enabled location Li using this process.

In this regard, an input-enabled location Li can use the entirety of the given usable area list. In such case, the original data Do can be converted to a first verification data Dv1, thereby corresponding to the case having the greatest number of changed portions. Through which, this embodiment can enable easy extraction of any forthcoming verification data, and even if an error occurs during the conversion procedure, verification can be performed.

Or an input-enabled location Li can be extracted by randomly selecting only a portion of the given usable area list. In such case, any unexpected damage of the content of the original data Do can be minimized by minimizing changes to the original data Do.

Or the input-enabled location Li can consecutively extract an input-enabled location according to the characteristics of the areas of the given usable area list. Below is detailed explanation of Step S348 of FIG. 14 above, when extraction is performed according to the characteristics of the areas, with reference to FIG. 6 to FIG. 9 and FIG. 15.

With reference to FIG. 15, the presence of substitutable areas, insertable areas and combined areas in the usable area list is checked in S348a.

Specifically, with reference to FIG. 6 and FIG. 9, a combined area Li3 can be a merged area of a substitutable area Li1 and an insertable area Li2. A merged area can be classified into an area merging substitutable areas Li1, an area merging insertable areas Li2 and an area merging a substitutable area Li1 with an insertable area Li2. Among which, the area merging a substitutable area Li1 with an insertable area Li2 can be defined as a combined area Li3.

Therefore, the combined area Li3 comprises two or more areas, and at least one of each sub-area can be a substitutable area Li1, and at least one of each sub-area can be an insertable area Li2.

The interpretation module 161 can identify substitutable areas Li1, insertable areas Li2 and combined areas Li3.

Again, with reference to FIG. 16, substitutable areas are extracted as input-enabled locations in S348b.

Specifically, with reference to FIG. 8 and FIG. 9, the size of the original data Do of a substitutable area Li1 may not increase due to the insertion of the first verification fingerprint Fp1 compared to an insertable area Li2 and a combined area Li3. Therefore, substitutable areas Li1 can be extracted as input-enabled locations as first priority.

Again, with reference to FIG. 15, it is determined whether further extraction of input-enabled locations is required in S348c.

Specifically, with reference to FIG. 8 and FIG. 9, the number of input-enabled locations Li can be predetermined. Therefore, if the required number of input-enabled locations Li is satisfied only with substitutable areas Li1, there is no further need to extract input-enabled locations Li.

If the required number of input-enabled locations is not satisfied only with substitutable areas Li1, the extraction of input-enabled location Li must be continued.

Again, with reference to FIG. 15, combined areas are extracted as input-enabled locations in S348d.

Specifically, with reference to FIG. 8 and FIG. 9, combined areas Li3 may have a relatively smaller expansion of the original data Do compared to insertable areas Li2. Therefore, combined areas Li3 can be extracted as input-enabled locations Li as second priority after substitutable areas Li1, and before insertable areas Li2.

Again, with reference to FIG. 15, it is determined whether further extraction of input-enabled locations is required in S348e.

Specifically, with reference to FIG. 8 and FIG. 9, if the required number of input-enabled locations Li is satisfied only with substitutable areas Li1 and combined areas Li3, there is no further need to extract input-enabled locations Li.

If the required number of input-enabled locations is not satisfied only with substitutable areas Li1 and combined areas Li3, the extraction of input-enabled location Li must be continued.

Again, with reference to FIG. 16, insertable areas are extracted as input-enabled locations in S348f.

Specifically, with reference to FIG. 8 and FIG. 9, insertable areas Li2 have the relatively largest expansion of the original data Do compared to substitutable areas Li1 or combined areas Li3. Therefore, insertable areas Li2 can be extracted lastly as input-enabled locations Li.

Below is an explanation of the verification method of the data access verification method according to some embodiments of the present inventive concept, with reference to FIG. 1. FIG. 10, FIG. 11 and FIG. 16.

With reference to FIG. 16, a second verification data and a data verification request are received from the client in S410.

Specifically, with reference to FIG. 1, FIG. 10 and FIG. 11, the service module 110 can receive a second verification data Dv2 from the client 10 of FIG. 1. In this regard, the second verification data Dv2 can be a verification data owned by the client 10 of FIG. 1. The client 10 can transmit a data verification request to the service module 110 along with the second verification data Dv2.

Again, with reference to FIG. 16, a second integrity value of a second verification data is generated in S420.

Specifically, with reference to FIG. 1, FIG. 10 and FIG. 11, the data module 120 can receive a second verification data Dv2 and hash the data to generate a second integrity value H2.

Again, with reference to FIG. 16, the presence of a second record corresponding to the second integrity value is determined in S430.

Specifically, with reference to FIG. 1, FIG. 10 and FIG. 11, if the second verification data Dv2 is identical to the above-described first verification data Dv1, the second integrity value H2 may be identical to the first integrity value H1. In addition, the second record may be identical to the first record.

If there is no second record corresponding to the second integrity value H2, a request fail message is transmitted to the client in S490.

If there is a second record corresponding to the second integrity value H2, the verification procedure can be continued.

Again, with reference to FIG. 16, the original data corresponding to the second record is loaded in S440.

Specifically, with reference to FIG. 1, FIG. 10 and FIG. 11, the data module 120 can transmit a first data eigenvalue I1 corresponding to the original data Do to the data warehouse 130, and receive the original data Do.

Again, with reference to FIG. 16, a second verification fingerprint is extracted by contrasting the original data to the second verification data in S450.

Specifically, with reference to FIG. 1, FIG. 10 and FIG. 11, the data module 120 can extract a second verification fingerprint Fp2 by contrasting the original data Do with the second verification data Dv2. In this regard, if the second verification data Dv2 is identical to the above-described first verification data Dv1, the second verification fingerprint Fp2 can be identical to the first verification fingerprint Fp1.

Again, with reference to FIG. 16, the success of extraction is determined in S460.

If the extraction of the second verification fingerprint has failed, a request fail message is transmitted to the client in S490.

If the extraction of the second verification fingerprint has succeeded, the verification procedure can continue.

Then, a verification is made using the second verification fingerprint and the second integrity value in S470.

Specifically, with reference to FIG. 1, FIG. 10 and FIG. 11, the verification database 150 can receive a second integrity value H2 and a second verification fingerprint Fp2 from the verification module 140. The verification database 150 can transmit a fourth acknowledgement Ack4 to the verification module 140. The fourth acknowledgement Ack4 can be an acknowledgement of the second integrity value H2 and the second verification fingerprint Fp2 being in the same record. If the second verification fingerprint Fp2 and the second integrity value H2 exist in the same record, i.e., the second record, verification of the second verification data Dv2 can be completed.

Then, the verification result is transmitted to the client in S480.

Specifically, with reference to FIG. 1, FIG. 10 and FIG. 11, the service module 110 can receive a fourth acknowledgement Ack4 from the verification module 140. The service module 110 can send the fourth acknowledgement Ack4 to the client 10.

Figure 17:
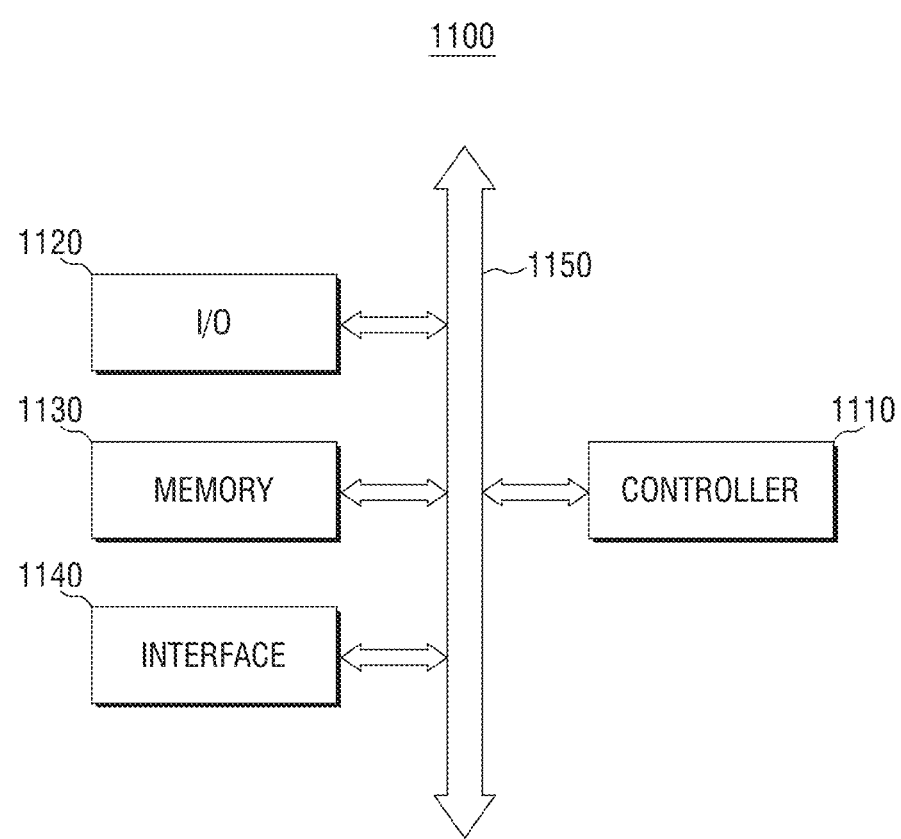
FIG. 17 is a block diagram of an electronic system implementing the system for embedding a digital verification fingerprint according to the embodiments of the described technology.

FIG. 17 is a block diagram of an electronic system implementing the system for verifying data access according to the embodiments of the present inventive concept.

With reference to FIG. 17, the electronic system 100 according to the embodiments of the present inventive concept can comprise a controller 1110, an input/output device (1120, I/O), a memory device 1130, an interface 1140 and a bus 1150. The controller 1110, the input/output device 1120, the memory device 1130 and/or the interface 1140 can be coupled together via the bus 1150. The bus corresponds to a path on which data is transferred.

The controller 1110 can comprise one or more of a CPU (Central Processing Unit), an MPU (Micro Processor Unit), an MCU (Micro Controller Unit), a GPU (Graphic Processing Unit), a microprocessor, a digital signal process, a microcontroller, an AP (Application Processor) and logic elements that can perform similar functions as the devices above. The input/output device 1120 can comprise a keypad, a keyboard, a touchscreen and a display device. The memory device 1130 can store data and/or commands, etc.

The interface 1140 can perform the function of transmitting data to a communication network or receiving data from a communication network. The interface 1140 can be in wired or wireless form. For example, the interface 1140 can comprise an antenna or a wired/wireless transceiver, etc. Although not depicted, the electronic system 1100 is a driving memory for improving the operation of the controller 1110, which can further comprise a high-speed DRAM and/or SRAM.

The electronic system 1100 can be applied to a PDA (personal digital assistant), a portable computer, a web tablet, a wireless phone, a mobile phone, a digital music player, a memory card or all electronic products that can transmit and/or receive information in a wireless environment.

Or the system for verifying data access according to the embodiments of the present inventive concept can be a system formed by connecting a plurality of electronic systems 1100 via a network. In such case, each module or a combination of modules can be implemented as an electronic system 1100.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the described technology.

What is claimed is:

1. An electronic system for embedding a digital verification fingerprint, comprising:
a memory storing instructions; and
a processor configured to execute the instructions to:
receive a data request from a client;
in response to receipt of the data request, transmit information associated with the data request to a data warehouse;
in response to receipt of the data request, generate a first verification fingerprint indicated as hex codes;
receive from the data warehouse an original data indicated as hex codes corresponding to the data request, the original data comprising a content and an unused area unused by the content;
check a data type of the original data;
retrieve an embedding location preset list according to the data type of the original data, wherein the embedding location preset list is located in the unused area and comprises list information of a plurality of insertable areas within the unused area;
process the embedding location preset list to locate an input-enabled location in the unused area where the first verification fingerprint indicated as hex codes is to be inserted without changing or damaging the content of the original data;
insert the first verification fingerprint indicated as hex codes into the input-enabled location within the unused area to generate a first verification data in which the content of the original data is not changed or damaged by the inserting;
process the first verification data to generate a first integrity value of the first verification data;
transmit to a verification database, original data access request information comprising the first verification fingerprint, the first integrity value and information associated with the data request such that the original data access request information is stored in the verification database;
receive a data verification request and a second verification data from the client;
process the second verification data to generate a second integrity value;
determine presence of a record corresponding to the second integrity value;
in response to determining that there is the record corresponding to the second integrity value, receive the original data from the data warehouse and contrast the original data and the second verification data to extract a second verification fingerprint from the second verification data, wherein the second verification fingerprint corresponds to a difference between the original data and the second verification data;
determine success of extraction of the second verification fingerprint;
in response to determining that the extraction of the second verification fingerprint has succeeded, determine whether the second verification fingerprint exists in the record corresponding to the second integrity value; and
in response to determining that the second verification fingerprint exists in the record corresponding to the second integrity value, transmit a verification result to the client,
wherein the verification result comprises an acknowledgement of the second integrity value and the second verification fingerprint being in the same record.

2. The system for embedding a digital verification fingerprint according to claim 1, wherein the processor is further configured to receive information of the data type to deliver it to a preset database, and receive the embedding location preset list from the preset database.

3. The system for embedding a digital verification fingerprint according to claim 1, wherein the processor is further configured to appoint a review area from the plurality of insertable areas, and determine whether the review area has been used to select it as the input-enabled location.

4. The system for embedding a digital verification fingerprint according to claim 3, wherein the processor is further configured to determine a length of the review area to select it as the input-enabled location.

5. A method for inserting a digital verification fingerprint, comprising:
receiving, by a processor of a digital verification fingerprint embedding system, a data request from a client;
in response to receipt of the data request, transmitting, by the processor, information associated with the data request to a data warehouse;
in response to receipt of the data request, generating, by the processor, a first verification fingerprint indicated as hex codes;
receiving from the data warehouse, at the processor, an original data indicated as hex codes corresponding to the data request, the original data comprising a content and an unused area unused by the content;
checking, at the processor, a data type of the original data;
retrieving, at the processor, an embedding location preset list according to the data type of the original data, wherein the embedding location preset list is located in the unused area and comprises list information of a plurality of insertable areas within the unused area;
processing, at the processor, the embedding location preset list to locate an input-enabled location in the unused area where the first verification fingerprint indicated as hex codes is to be inserted without changing or damaging the content of the original data;
inserting, at the processor, the first verification fingerprint indicated as hex codes into the input-enabled location within the unused area to generate a first verification data in which the content of the original data is not changed or damaged by the inserting;;
processing, at the processor, the first verification data to generate a first integrity value of the first verification data;
transmitting, by the processor, to a verification database, original data access request information comprising the first verification fingerprint, the first integrity value and information associated with the data request such that the original data access request information is stored in the verification database;
receiving, by the processor, a data verification request and a second verification data from the client;
processing, at the processor, the second verification data to generate a second integrity value:
determining, at the processor, presence of a record corresponding to the second integrity value:
in response to determining that there is the record corresponding to the second integrity value, receiving, at the processor, the original data from the data warehouse and contrasting, at the processor, the original data and the second verification data to extract a second verification fingerprint from the second verification data, wherein the second verification fingerprint corresponds to a difference between the original data and the second verification data;
determining, at the processor, success of extraction of the second verification fingerprint;
in response to determining that the extraction of the second verification fingerprint has succeeded, determining whether the second verification fingerprint exists in the record corresponding to the second integrity value; and
in response to determining that the second verification fingerprint exists in the record corresponding to the second integrity value, transmitting, at the processor, a verification result to the client,
wherein the verification result comprises an acknowledgement of the second integrity value and the second verification fingerprint being in the same record.

6. The method for inserting a digital verification fingerprint according to claim 5, wherein the processing the embedding location preset list comprises:
appointing a review area from the embedding location preset list;
determining whether the review area has been used;

in response to determining that the review area has not been used, adding the review area to a reserve usable area list when a length of the review area is smaller than a length of the first verification fingerprint, and adding the review area to a usable area list when a length of the review area is greater or equal to a length of the first verification fingerprint; and extracting at least a portion of the usable area list as the input-enabled location.

7. The method for inserting a digital verification fingerprint according to claim 6, further comprising:

before extracting at least a portion of the usable area list as the input-enabled location, determining whether all areas of the embedding location preset list have been checked;

in response to all areas having been checked, determining whether two or more review areas have been added to the reserve usable area list;

in response to two or more review areas having been added to the reserve usable area list, generating a merged area merging the review areas added to the reserve usable area list; and in response to a length of the merged area being greater than or equal to a length of the first verification fingerprint, adding the merged area to the usable area list.

8. The method for inserting a digital verification fingerprint according to claim 7, wherein the embedding location preset list further comprises an input-unenabled area, and wherein the merged area comprises a substitutable area, an insertable area and a combined area combining the substitutable area and the insertable area.

9. The method for inserting a digital verification fingerprint according to claim 8, wherein the processing the embedding location preset list comprises:

randomly extracting one or more areas of the usable area list as the input-enabled location.

10. The method for inserting a digital verification fingerprint according to claim 8, wherein the processing the embedding location preset list comprises extracting all areas included in the usable area list as the input-enabled location.

11. The method for inserting a digital verification fingerprint according to claim 8, wherein the processing the embedding location preset list comprises:

first extracting the substitutable area from an area included in the usable area list;

determining whether further extraction of the input-enabled location is needed;

in response to further extraction of the input-enabled location being needed, further extracting the insertable area from an area included in the usable area list;

determining whether further extraction of the input-enabled location is needed; and in response to further extraction of the input-enabled location being needed, extracting the combined area from an area included in the usable area list.

12. The method for inserting a digital verification fingerprint according to claim 5, further comprising:

storing a data eigenvalue and the first verification fingerprint corresponding to the original data in a first record;

generating the first integrity value that has hashed the first verification data; and additionally storing the first integrity value in the first record to renew the first record.

13. The method for inserting a digital verification fingerprint according to claim 5, wherein an appearance of the first verification data is completely identical to an appearance of the original data.

14. The method for inserting a digital verification fingerprint according to claim 5, wherein an appearance of the first verification data is different from an appearance of the original data.

15. The method of claim 5, wherein the embedding location preset list comprises a list of a plurality of areas, which comprise one or more of substitutable areas or insertable areas.

16. The method of claim 5, wherein the embedding location preset list displays the list information using an offset and regular expressions in the original data.

17. The method of claim 5, wherein the embedding location preset list comprises a combined area comprising sub-areas, each of which is a substitutable area or an insertable area.

18. The method of claim 5, wherein the first verification fingerprint is randomly generated.

* * * * *